US012592551B2

(12) United States Patent
Wilson

(10) Patent No.: US 12,592,551 B2
(45) Date of Patent: Mar. 31, 2026

(54) MULTI-RANGE CABLE CLIP

(71) Applicant: ERICO International Corporation,
Solon, OH (US)

(72) Inventor: Eric J. Wilson, Solon, OH (US)

(73) Assignee: ERICO International Corporation,
Solon, OH (US)

( * ) Notice: Subject to any disclaimer, the term of this
patent is extended or adjusted under 35
U.S.C. 154(b) by 27 days.

(21) Appl. No.: 18/654,888

(22) Filed: May 3, 2024

(65) Prior Publication Data

US 2024/0372349 A1 Nov. 7, 2024

Related U.S. Application Data

(60) Provisional application No. 63/500,529, filed on May
5, 2023.

(51) Int. Cl.
*H02G 3/00* (2006.01)

(52) U.S. Cl.
CPC .................................... *H02G 3/26* (2013.01)

(58) Field of Classification Search
CPC ...................................................... H02G 3/26
USPC ...................................................... 248/68.1
See application file for complete search history.

(56) References Cited

U.S. PATENT DOCUMENTS

| | | | |
|---|---|---|---|
| 810,004 A | 1/1906 | Tabler | |
| 1,246,325 A | 11/1917 | Rohmer | |
| 2,279,866 A | 4/1942 | Ellinwood | |
| 3,019,954 A | 2/1962 | Faltin | |
| 3,074,675 A * | 1/1963 | Brown | F16L 3/13 |
| | | | D25/199 |
| 3,090,826 A | 5/1963 | Cochran | |
| 3,163,712 A | 12/1964 | Cochran | |
| 3,216,685 A | 11/1965 | Alain | |
| 3,430,904 A | 3/1969 | Soltysik | |
| 3,599,915 A * | 8/1971 | Soltysik | F16B 2/065 |
| | | | 248/68.1 |
| 4,591,119 A | 5/1986 | Kraus | |
| 5,027,548 A | 7/1991 | Anderson | |
| 5,060,891 A | 10/1991 | Nagy et al. | |
| 5,141,185 A | 8/1992 | Rumbold et al. | |

(Continued)

FOREIGN PATENT DOCUMENTS

| | | |
|---|---|---|
| AU | 2008239717 B2 | 5/2013 |
| CA | 2040739 A1 | 1/1992 |

(Continued)

*Primary Examiner* — Anita M King
(74) *Attorney, Agent, or Firm* — Quarles & Brady LLP

(57) ABSTRACT

A bracket to support cable or conduit can include an attachment portion configured to secure the bracket to a building. The bracket can include a support leg that extends from the stud attachment portion at a first end of the support leg. The bracket can include a support clip that extends from a second end of the support leg to define a support passage for cable or conduit. The support clip can include a base that extends from the support leg. The support clip can include an outer arm that extends from the base to define an outer support profile along an outer side of the support passage. The outer support profile can include a first portion oriented to support cable or conduit in the support passage. The support clip can include an inner arm that extends from the base to define an inner support profile within the support passage.

19 Claims, 24 Drawing Sheets

(56) References Cited

U.S. PATENT DOCUMENTS

| | | | | |
|---|---|---|---|---|
| 5,267,710 | A | 12/1993 | Condon | |
| 5,370,345 | A | 12/1994 | Condon | |
| 5,535,970 | A * | 7/1996 | Gobbi | F16L 3/13 |
| | | | | 248/74.1 |
| 5,587,555 | A | 12/1996 | Rinderer | |
| 5,626,316 | A * | 5/1997 | Smigel | H02G 3/32 |
| | | | | 248/68.1 |
| 5,677,513 | A * | 10/1997 | Ito | F16L 3/23 |
| | | | | 24/339 |
| 6,572,058 | B1 | 6/2003 | Gerardo | |
| 7,866,611 | B2 | 1/2011 | Hollender et al. | |
| 8,253,040 | B2 | 8/2012 | Hopkins | |
| 8,371,540 | B1 | 2/2013 | Medlin, Jr. | |
| 8,387,927 | B1 | 3/2013 | Medlin, Jr. | |
| 8,496,211 | B2 | 7/2013 | Rinderer | |
| 8,545,041 | B2 * | 10/2013 | Brown | F21V 21/0885 |
| | | | | 24/336 |
| 8,746,633 | B1 | 6/2014 | Medlin, Jr. | |
| 9,136,681 | B1 | 9/2015 | Medlin, Jr. | |
| 9,206,925 | B2 | 12/2015 | Rouleau et al. | |
| 9,562,628 | B2 | 2/2017 | Nuernberger | |
| 10,208,874 | B2 | 2/2019 | Geiger et al. | |
| 10,228,080 | B2 | 3/2019 | Zvak | |
| 10,760,714 | B2 | 9/2020 | Rajpal et al. | |
| 10,823,312 | B2 * | 11/2020 | Vaccaro | F16L 3/133 |
| 10,847,960 | B1 | 11/2020 | Naugler et al. | |
| 11,181,210 | B2 | 11/2021 | Rajpal et al. | |
| 11,268,633 | B2 | 3/2022 | Allender-Zivic | |
| 11,421,803 | B2 | 8/2022 | Arnold | |
| 2007/0235596 | A1 | 10/2007 | Youmans | |
| 2008/0142646 | A1 | 6/2008 | Magno et al. | |
| 2009/0308987 | A1 | 12/2009 | Martha Exposito | |
| 2013/0015301 | A1 | 1/2013 | Zvak | |
| 2014/0103170 | A1 | 4/2014 | Zvak | |
| 2019/0154170 | A1 | 5/2019 | Geiger et al. | |
| 2022/0057022 | A1 | 2/2022 | Rajpal et al. | |

FOREIGN PATENT DOCUMENTS

| | | | |
|---|---|---|---|
| CA | 2084559 | C | 4/1995 |
| CA | 2150782 | C | 1/1999 |
| CA | 2614784 | A1 | 6/2008 |
| CA | 2652520 | A1 | 8/2009 |
| CA | 2588860 | C | 5/2012 |
| CN | 110145640 | A | 8/2019 |
| DE | 4031237 | A1 | 4/1992 |
| DE | 9405363 | U1 | 8/1994 |
| EP | 3926221 | A1 | 12/2021 |
| MX | 2007006227 | A | 12/2008 |
| MX | 2007016088 | A | 2/2009 |
| WO | 2008127547 | A1 | 10/2008 |
| WO | 2018111513 | A1 | 6/2018 |

* cited by examiner

MULTI-RANGE CABLE CLIP

CROSS-REFERENCE TO RELATED APPLICATIONS

This application claims priority to and incorporates by reference U.S. Provisional Application No. 63/500,529, filed May 5, 2023.

BACKGROUND

In many applications, it may be useful to secure a conduit or cable within a certain distance from an entrance or exit to an electrical box. For example, some electrical codes can require conduit or cable to be secured to building structure within a certain height above an electrical box.

SUMMARY

Some embodiments of the invention provide a stud-mounted bracket to support cable or conduit relative to an electrical box. The stud-mounted bracket can include a stud attachment portion securable to a stud of a building. The stud-mounted bracket can include a support leg that extends integrally from the stud attachment portion at a first end of the support leg. The stud-mounted bracket can include a support clip that extends integrally from a second end of the support leg to define a support passage for cable or conduit. The support clip can integrally include a base that extend from the support leg. The support clip can integrally include an outer arm that extends from the base to define an outer support profile along an outer side of the support passage, relative to the support leg, the outer support profile can include a first portion, concave relative to the support leg, oriented to support cable or conduit of a first diameter in the support passage. The support clip can integrally include an inner arm that extends from the base or the outer arm to define an inner support profile within the support passage, between the outer arm and the support leg. The inner support profile can include a first portion that is convex relative to the outer arm and oriented to support the cable or conduit of the first diameter on a first side of the inner arm that faces away from the support leg, in combination with the outer arm. The inner support profile can include a second portion that extends from the first portion of the inner arm, is convex relative to the support leg, and can be oriented to support cable or conduit of a second diameter, smaller than the first diameter, on a second side of the inner arm that faces toward the support leg.

In some examples, the base can include a first portion that may be concave relative to the support passage and oriented between the inner arm and the support leg to receive the cable or conduit of the second diameter rearward of the second portion of the inner arm.

In some examples, the cable or conduit of the second diameter can be a first cable or conduit of the second diameter, wherein the first portion of the inner arm may be spaced from the support leg to resiliently support a second cable or conduit of the second diameter on the second side of the inner arm while the first cable or conduit of the second diameter may be received within the first portion of the base.

In some examples, the inner arm may extend from the base.

In some examples, the support clip may further include a reduction finger that extends from the outer arm into the support passage to support the cable or conduit of the first diameter in combination with the first portion of the inner arm. The reduction finger may extend rearwardly from the outer arm and the inner arm may extend forwardly from the base or outer arm relative to the stud as secured to the stud attachment portion. The reduction finger may be aligned with a cut out in the outer arm to be resiliently deflectable through the outer arm to support a cable or conduit of a third diameter within the support passage with the third diameter being larger than the first diameter.

In some examples, the inner arm may extend from a first end, connected to the base or the outer arm, to a second end. The second end may be aligned to contact the support leg, with the cable or conduit of the first diameter supported on the first side of the inner arm by the first portion of the inner arm. The contact of the second end with the support leg may prevent the inner arm from extending through the support leg.

In some examples, the first diameter may be a ¾ inch diameter.

In some examples, the second diameter may be a ½ in diameter.

In some examples, the third diameter may be a 1 inch diameter.

In some examples, a reduction finger may extend into the support passage and may be resiliently deflectable to selectively support the cable or conduit of the first diameter or a cable or conduit of a third diameter.

In some examples, the inner arm may be spaced from the outer arm and the support leg, and can be resiliently deflectable to simultaneously support the cable or conduit of the first diameter on the first side of the inner arm, and multiple cables or conduits of the second diameter on the second side of the inner arm.

Some embodiments of the invention provide a bracket to support cable or conduit relative to an electrical box. The bracket may include an attachment portion to secure the bracket to a building structure, a support leg that extends from the attachment portion, and a support clip that extends from the support leg. The support clip may include an outer arm and an inner arm that may extend between the outer arm and the support leg. The outer and inner arms may collectively define a first entrance to a support passage to resiliently support cable or conduit of a first diameter on a first side of the inner arm. The inner arm and the support leg may collectively define a second entrance to the support passage to resiliently support cable or conduit of a second diameter, smaller than the first diameter, on a second side of the inner arm.

In some examples, the support clip may further include a reduction finger that extends into the support passage to selectively support the cable or conduit of the first diameter or a cable or conduit of a third diameter larger than the first diameter.

In some examples, a base of the support clip may form a pocket at an end of the support passage to support a second cable or conduit of the second diameter on the second side of the inner arm.

Some embodiments of the invention provide a method of supporting cable or conduit relative to an electrical box. The method may include attaching a bracket to a building structure with a support clip of the bracket supported at an offset from the building structure by a support leg of the bracket. The method may also include selectively inserting cable or conduit into a support passage defined between the support leg and an outer arm of the support clip, to one or more of support a cable or conduit of a first diameter in the support passage, between the outer arm and an inner arm of the support clip that extends into the support passage, or support a cable or conduit of a second diameter in the support passage, between the inner arm and the support leg.

In some examples, selectively inserting the cable or conduit into the support passage may include inserting the cable or conduit of the second diameter into the support passage through an entrance defined by the inner arm and the support leg, to support the cable or conduit of the second diameter between the inner arm and the support leg.

In some examples, selectively inserting the cable or conduit into the support passage may include inserting a second cable or conduit of the second diameter into the support passage through the entrance, to support the second cable or conduit between the inner arm and the support leg.

In some examples, supporting the cable or conduit of the first diameter in the support passage between the outer arm and the inner arm may urge the inner arm against the support leg

BRIEF DESCRIPTION OF THE DRAWINGS

The accompanying drawings, which are incorporated in and form a part of this specification, illustrate embodiments of the disclosure and, together with the description, serve to explain the principles of embodiments of the disclosure.

DETAILED DESCRIPTION

Figure 1A:
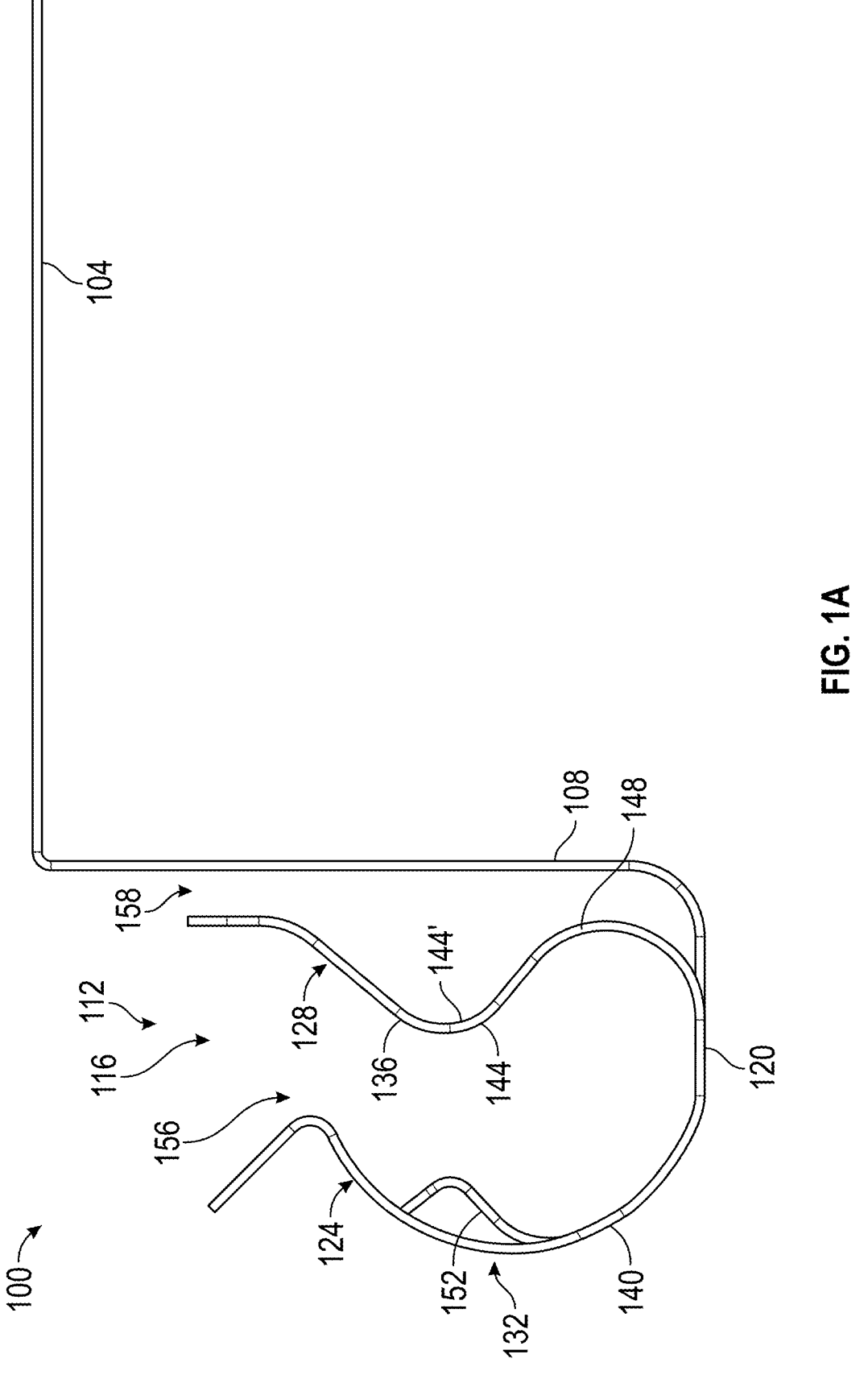
FIGS. 1A through 1C ("FIG. 1") are top plan and isometric views of a bracket to support cable or conduit according to an example of the disclosed technology.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

As noted above, in some contexts, it may be useful to secure a conduit or cable relative to building structures. In some examples, a stud-mounted bracket that can include a support clip can secure a conduit or cable to support the conduit or cable within a certain distance from an electrical box.

Conventional designs can limit a user to only affixing conduit or cable of a single diameter, to support the conduit or cable relative to an electrical box. There is accordingly a need for an improved devices to support multiple conduit or cable, or conduit or cable of various diameters for in-wall electrical applications.

Examples of the disclosed technology can address these or other issues by providing a stud-mounted bracket including a support clip configured to support more than one diameter of conduit or cable. For example, some examples can include a support clip with an outer arm that can flex resiliently outward to allow a conduit or cable of a first diameter to enter the clip and an inner arm extending from the outer arm to another diameter of conduit or cable of a second diameter (e.g., separately or simultaneously with the outer arm). With such an arrangement, for example, an installer can use a single support clip to support a ½" or ¾" conduit or cable for a homerun and a metal clad (MC) or armored clad (AC) whip to an adjacent box or device.

In some embodiments, a stud-mounted bracket can include a reduction finger (e.g. small diameter reducing finger), extending from the outer arm to help grip cable or conduit of particular diameters (e.g., MC or AC cable). For example, a reduction finger can flex by varying degrees, relative to the outer arm to hold different diameters of conduit or cable, with spring action maintaining holding pressure on the conduit or cable. In some embodiments, the reduction finger can be attached to the distal end of the outer arm. Such an arrangement, for example, can allow for easier installation and removal of the conduit or cable.

FIG. 1 illustrate an example stud-mounted bracket 100 to support cable or conduit relative to an electrical box (not shown) according to an embodiment of the disclosure. In the illustrated example, the stud-mounted bracket 100 includes a stud attachment portion 104 configured to be secured to a stud of a building (not shown). There can be a variety of known structures or configurations for the stud attachment portion 104, including snap-to-stud configurations as well as various known structures configured to be secured with nails, screws, or other fasteners to metal or wood building studs. Further, although a stud-mounted bracket is shown and discussed herein in particular, some examples may be configured for attachment to other structures.

A support leg 108 extends integrally from the stud attachment portion 104 and a support clip 112 extends integrally from the support leg 108. Further, in some embodiments, the support leg 108 extend integrally from the stud attachment portion 104 at a first end of the support leg. In some embodiments, the support clip 112 extends integrally from a second end of the support leg. As shown, the support clip 112 defines a support passage 116 for cable or conduit. In particular, as further detailed below, various arms of the support clip can be configured to adaptably support cable or conduit of various diameters, including for simultaneous support of multiple cable or conduit of different diameters in some cases. Thus, the offset rearward of the stud attachment portion 104 provided by the support leg 108 can help to align the support clip 112 to engage cable or conduit extending from an associated electrical box (e.g., as attached to the same stud as the bracket 100).

Figure 1B:
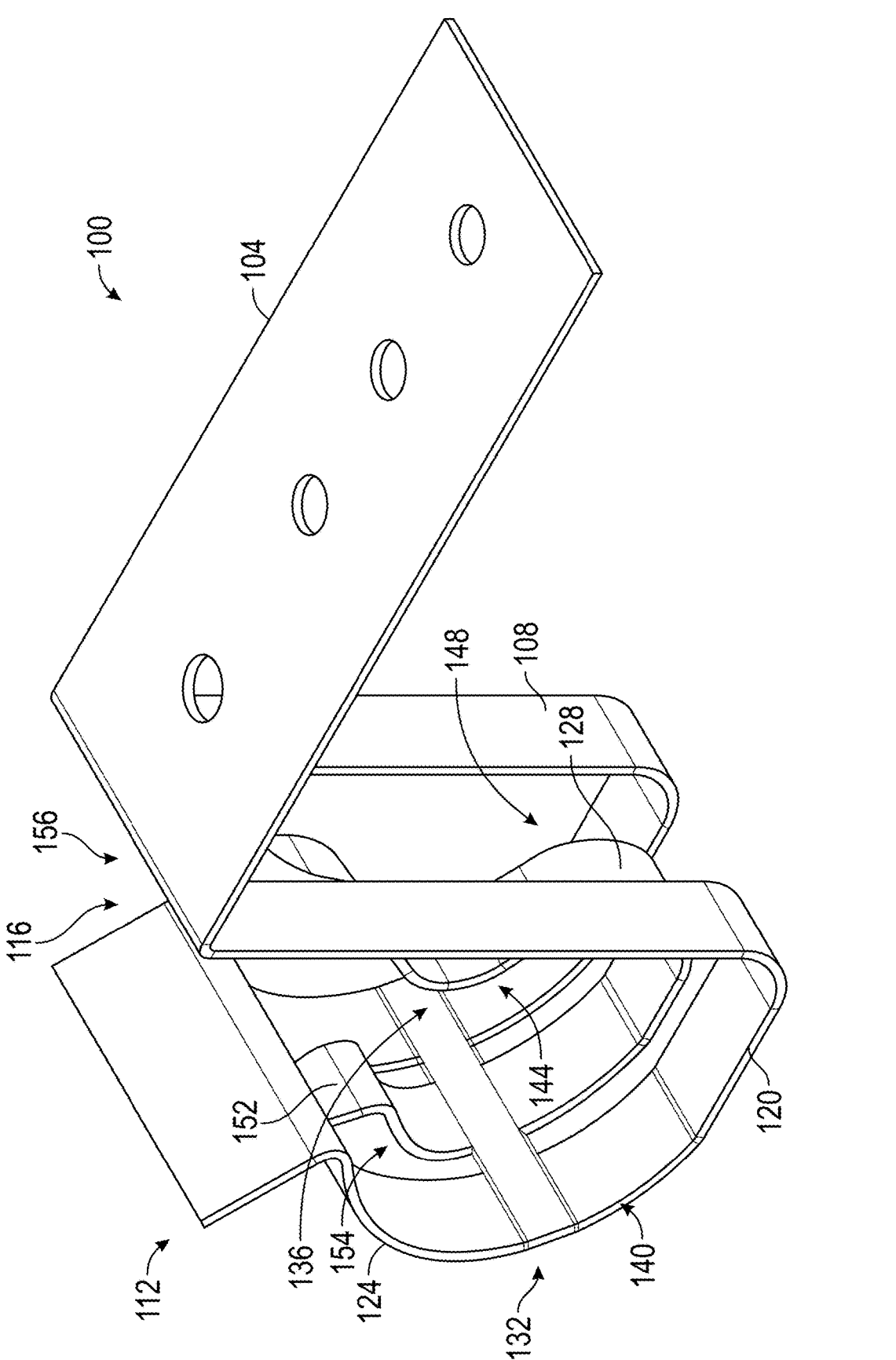

In the illustrated example of FIG. 1, the support clip 112 integrally includes a base 120 that extends from the support leg 108 and then transitions into an outer arm 124. In particular, the outer arm 124 extends from the base 120 to define an outer support profile 132 on an outer side of the support passage 116. An inner arm 128 can also be supported by the base 120 to define an inner support profile 136 within, and toward an inner side of, the support passage 116, relative to support leg 108 and the stud that the stud attachment portion 104 is secured to. In some embodiments, the inner arm 128 extends forwardly from the base 120 or the outer arm 124. As such, the inner arm 128 can be deflectable to simultaneously support cable or conduit on either side of the inner arm. As shown in FIG. 1B in particular, in some cases the inner arm 128 can extend from the outer arm 124 and thus be indirectly supported by the base 120. For example, as shown, the inner arm 128 can extend from a cross-member between separated portions of the outer arm 124. Thus, for example, the inner arm 128 can exhibit a relatively long lever-arm configuration and accordingly be resiliently deflectable to a relatively large degree to accommodate different cable or conduit sizes.

In some examples, including as shown, the outer and inner arms 24, 128 collectively define a first and second entrances to the support passage. Correspondingly, the inner arm 128 can define a first side that faces away (e.g., outer side) from the support leg 108. Further, the inner arm 128 can define a first side that faces towards (e.g., inner side) from the support leg 108.

Relative to the support passage 116, the outer support profile 132 defines a first concave curved portion 140. Aligned with the curved portion 140, the inner support profile 136 defines a first portion of the inner support profile is convex relative to the outer arm 124, and a second portion of the inner support profile that is convex relative to the support leg 108. Correspondingly, in the illustrated example, the first portion defines a first convex curved portion 144 to support cable or conduit of a first diameter in the support passage 116. The convex curved portion 144 also defines a corresponding concave curved portion 144' relative to the support leg 108, as also further discussed below. Additionally, relative to the outer arm 124, the second portion of the inner support profile defines a second concave curved portion 148 that extends from the first convex curved portion 144 towards the support leg 108 (and the base 120) to support cable or conduit of a second diameter, that is smaller than the first diameter. Thus, for example, the stud-mounted bracket 100 with the support clip 112 can be used to support cable or conduit of more than one diameter when secured to the stud of a building (or other building structure).

Figure 1C:
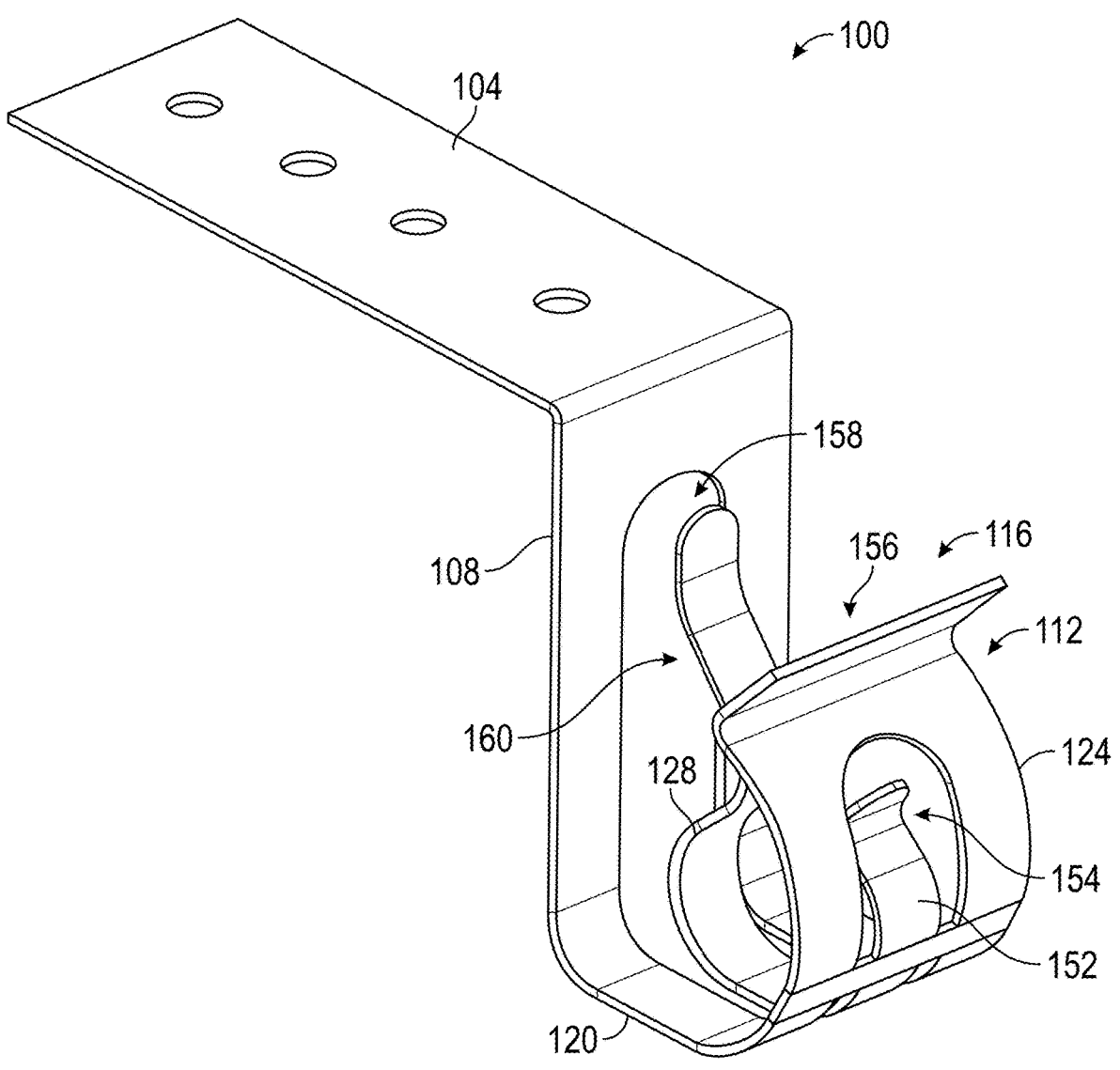

In the illustrated example of FIG. 1, the support clip 112 can further include a reduction finger 152 that extends from the outer arm 124 into the support passage 116. This arrangement can allow the support clip 112 to selectively support (e.g., resiliently support) a cable or conduit of a second diameter with the reduction finger 152 and the first convex curved portion 144. In some examples, the reduction finger 152 can extend from the outer arm towards an entrance opening of the support passage, or a cut out 154, as shown in specifically in FIG. 1B and FIG. 1C. In some examples, as further discussed below, other configurations are possible.

In some examples, as also noted above, a bracket according to the disclosed technology can be integrally formed, including with an inner arm that extends from a base or an outer arm. Correspondingly, in some examples, a support leg or an outer arm (or both) can be formed with two portions that are spaced apart from each other along an axial direction of a conduit that is to be secured thereby. This arrangement may result, for example, in an opening 160 through the support leg 108 that is generally aligned with the inner arm 128, as shown in FIG. 1C in particular.

In some examples, including as illustrated, a total length and profile of the inner arm 128 can be arranged so that the inner arm 128 is not deflected through the opening 160 by larger cable or conduit, but instead contacts the support leg 108 (e.g., at an end of the opening 160 closest to the front of an associated stud). Correspondingly, a support clip thus configured can help to prevent interference between an inner leg and a stud or other building structure, because the inner arm 128 may be blocked by the support leg 108 from contacting the stud or other structure when displaced by a cable or conduit. In some examples, the inner arm 128 may resiliently flex toward the support leg 108, and thus, be resiliently extended along the support leg 108 as deflected in general by an inserted conduit or cable.

Figure 2A:
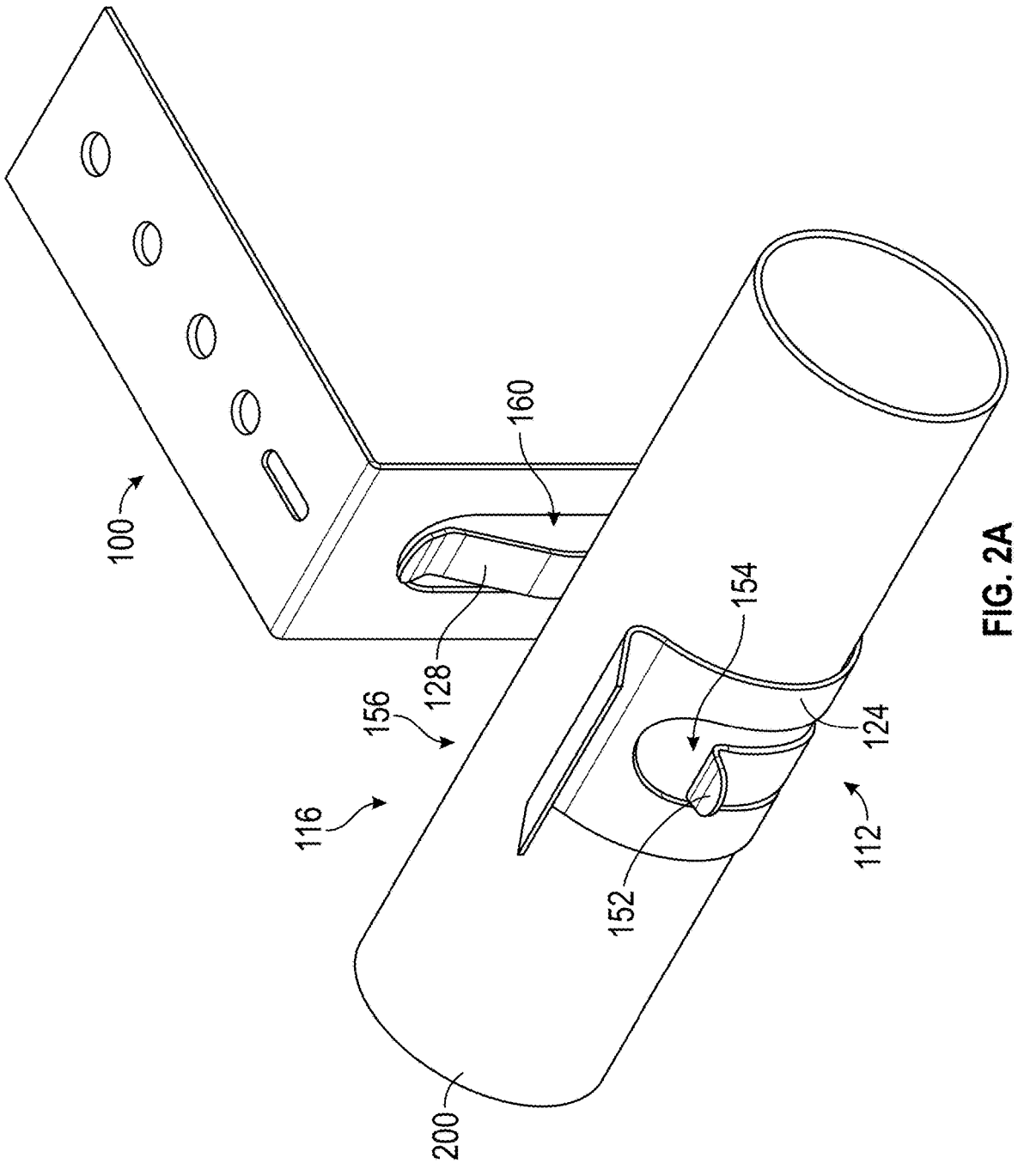
FIGS. 2A and 2B ("FIG. 2") illustrate isometric and top plan views of the bracket of FIG. 1 supporting conduit of a first size.
Figure 2B:
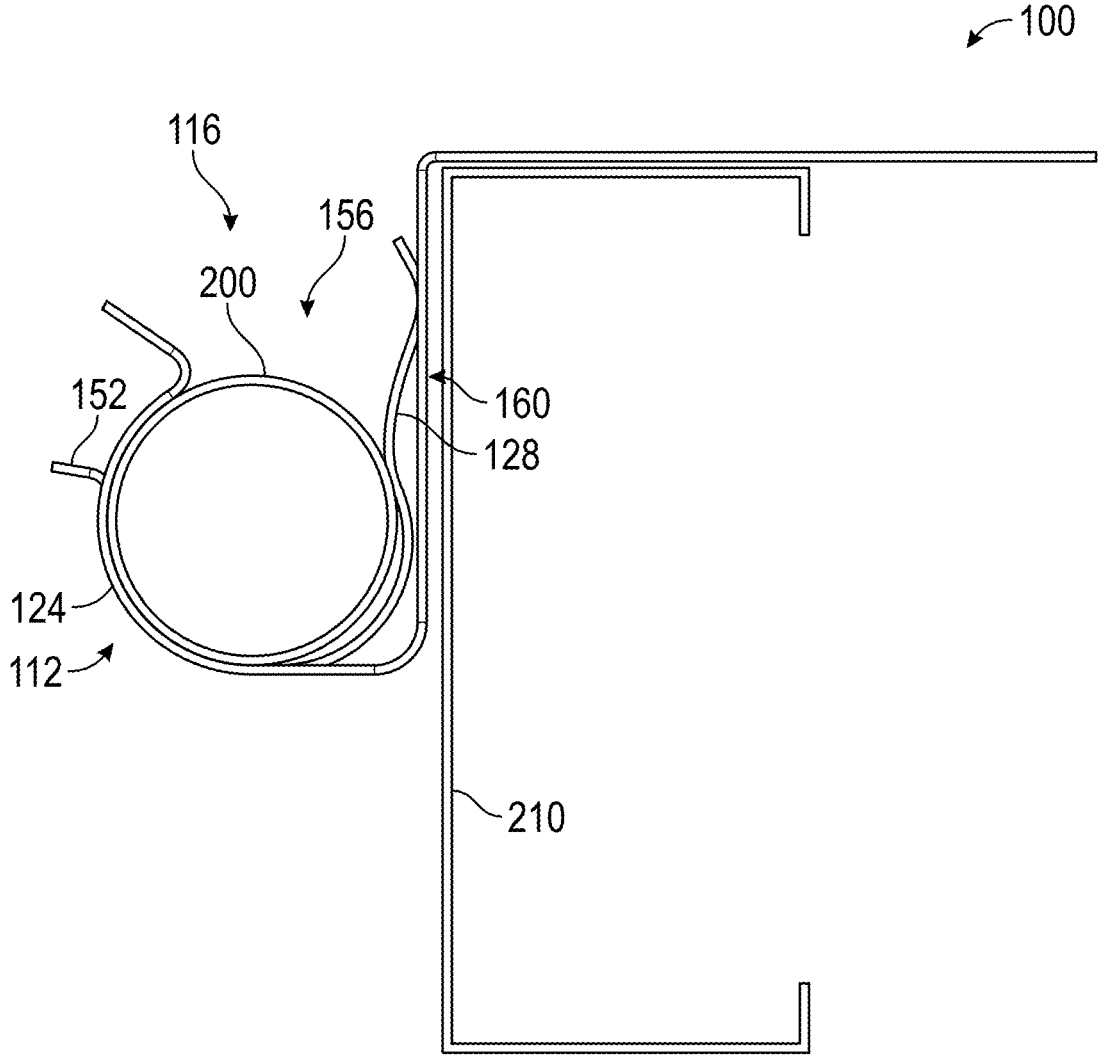

FIG. 2 illustrates the stud-mounted bracket 100 installed according to an example configuration. In the illustrated example, the support clip 112 holds a relatively large conduit 200 (e.g., a 1" electric metallic tube (EMT) conduit) in the support passage 116 and is secured to a metal stud 210. As shown, the outer arm 124 (e.g. main retainer clamp arm) and the inner arm 128 holds the conduit 200, so that the conduit 200 is between the outer support profile 132 and inner support profile 136 (see FIG. 1). As shown in FIG. 2, when the support clip 112 holds the conduit 200, the inner arm 128 can contact the support leg 108 both to further secure the conduit 200 in the support passage 116 and to prevent interference with the stud 210 (e.g., rather than extending through the opening 160).

In some embodiments, for larger conduits, for support of multiple diameters of conduit or cable, the outer arm 124 can flex resiliently outward to allow a conduit to enter the support clip 112 and clamp the conduit or cable once the conduit or cable is seated. Further in this regard, an outwardly flared profile at the distal end of the outer arm can assist users in easily introducing cable or conduit into the support passage 116. A similarly flared profile on the reduction finger 152 can be similarly useful, including as can help the reduction finger 152 to be easily deflected to the outside of the outer arm 124 through the opening 154 to accommodate larger-diameter cable or conduit.

Figure 3A:
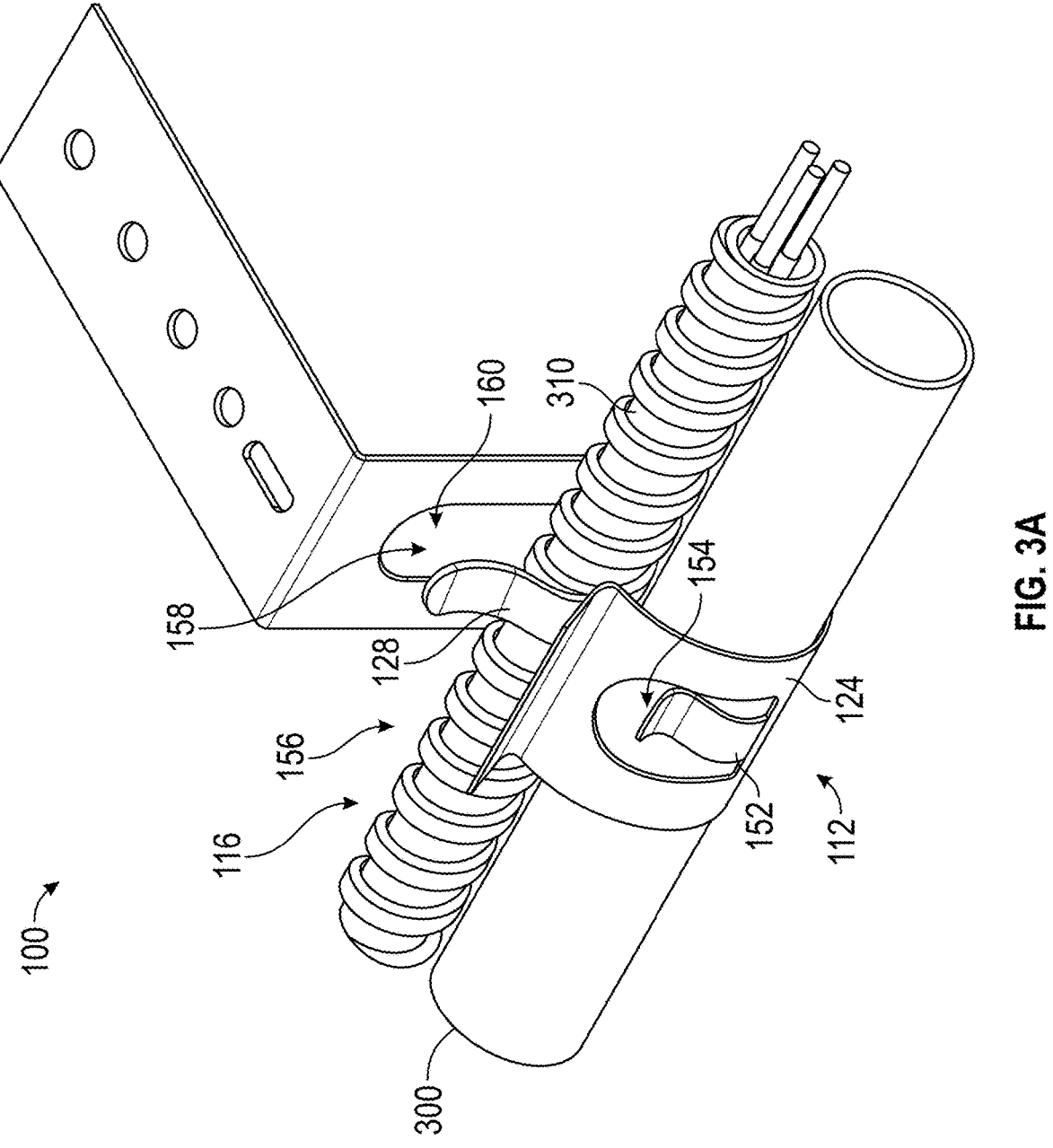
FIGS. 3A and 3B ("FIG. 3") illustrate isometric and top plan views of the bracket of FIG. 1 supporting conduit and cable of second and third sizes.
Figure 3B:
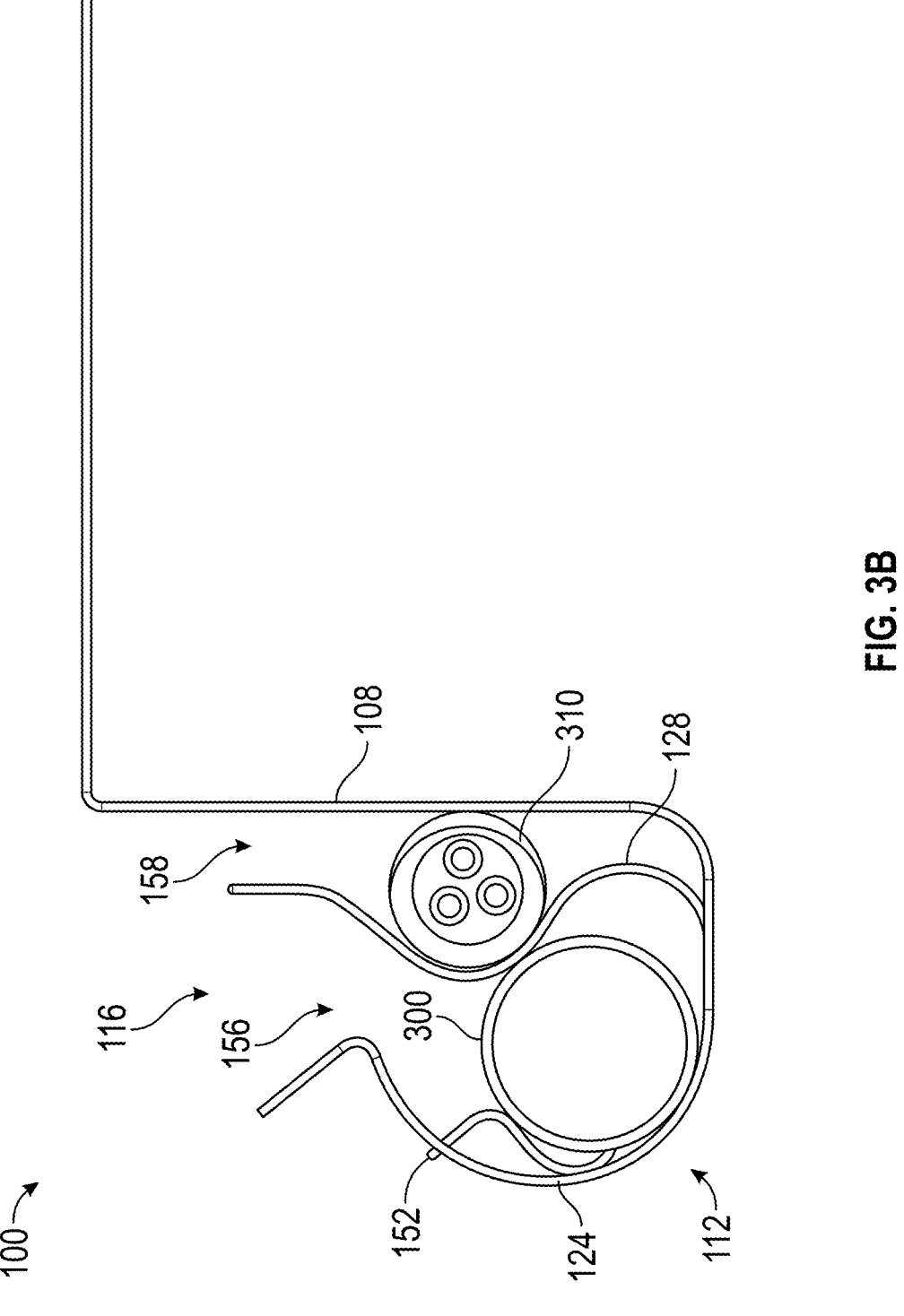

FIG. 3 illustrates the stud-mounted bracket 100 installed according to another example configuration. In the illustrated example, the support clip 112 holds a cable or conduit 300 of a first diameter in the support passage 116 and a cable or conduit 310 of a second (smaller) diameter between the inner arm 128 and the support leg 108. Thus, for example, the support clip 112 can simultaneously support a ¾" EMT conduit and an AC or MC cable, or other sets of cable or conduit. In other examples, the support clip 112 may simultaneously support a 1" EMT conduit and multiple AC or MC cables (e.g., two AC or MC cables). In particular, as shown, the larger of the conduit or cable is received into a first entrance 156 the support passage 116 to be secured between the reduction finger 152 and the first convex curved portion 144 of the inner arm 128 (see FIG. 1), and the smaller of the conduit or cable can be received into a second support entrance 158 between the inner arm 128 and the support leg 108, to be secured by the leg 108 and the concave curved portion 144'. In other examples, however, other configurations are possible (e.g., with different numbers of, or differently sized or arranged cable or conduit). For example, in some configurations, a ½" conduit can be similarly secured within the support passage 116, between the reduction finger 152 and the first convex curved portion 144 of the inner arm 128.

Figure 4:
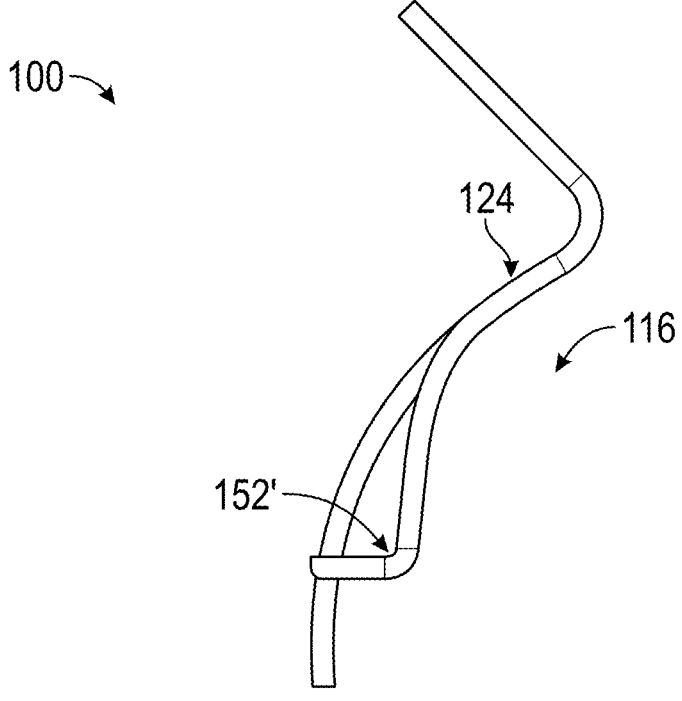
FIG. 4 is a top plan partial view of an alternate configuration of the bracket of FIG. 1.

In some cases, as generally noted above, a reduction finger can be provided. As discussed above, the reduction finger 152 can extend from the outer arm 124 toward an entrance to the support passage 116 (e.g., with an outwardly flared free end, as shown). In other examples, a reduction finger can otherwise extend to resiliently secure smaller-diameter cable or conduit within a support passage. For example, in the illustrated example of FIG. 4, the support clip 112 includes a reduction finger 152' that extends from the outer arm 124 away from an entrance to the support passage 116 (e.g., also with an outwardly extending free end). The reduction finger 152' can thus operate similarly to the reduction finger 152, but may permit easier installation of the cable or conduit into the support passage 116 and may also provide better blocking of removal of the cable or conduit from the support passage 116.

In some embodiments, a stud-mounted bracket can include a pocket, or a first concave portion of the base, extending from a second end of a support leg. The concave portion of the base may help grip cable or conduit of particular diameters (e.g., MC or AC cable). In some examples, the concave portion of the base may allow for multiple AC or MC cable to be stacked in the support channel while meeting NEC 1¼" setback requirements. For example, the concave portion of the base may be sized to fit a cable or conduit. In some examples, the size of the concave portion of the base may be slightly smaller than a particular diameter of a cable or conduit to provide a "snap fit" of the cable or conduit into the pocket. In some embodiments, the conduit or cable may be placed into the pocket after passing through a second entrance of a support passage.

In other embodiments, a stud mounting bracket may include a tab extending from an end of an inner arm. The tab may help in inserting cable or conduit into a support passage. In particular, the tab may help inserting cable or conduit into the support passage via a second entrance of the support passage. For example, the tab may be resiliently flexed (e.g., moved, translated, etc.) away from a support leg such that a cable or conduit may be inserted through the second entrance. In other examples, the tab may be resiliently flexed toward the support leg of the bracket such that a cable or conduit may be inserted through a first entrance of the support passage. Additionally, in some embodiments, flexing the tab of the resilient inner arm in a direction parallel to a support leg may advantageously allow for better insertion of a cable or conduit into the support passage via the first entrance and/or the second entrance. Further, in some embodiments, once a conduit or cable has been placed in the support passage, the resilient tab and corresponding inner arm may help secure the conduit or cable such that the conduit or cable are firmly secured within the support passage.

Figure 5A:
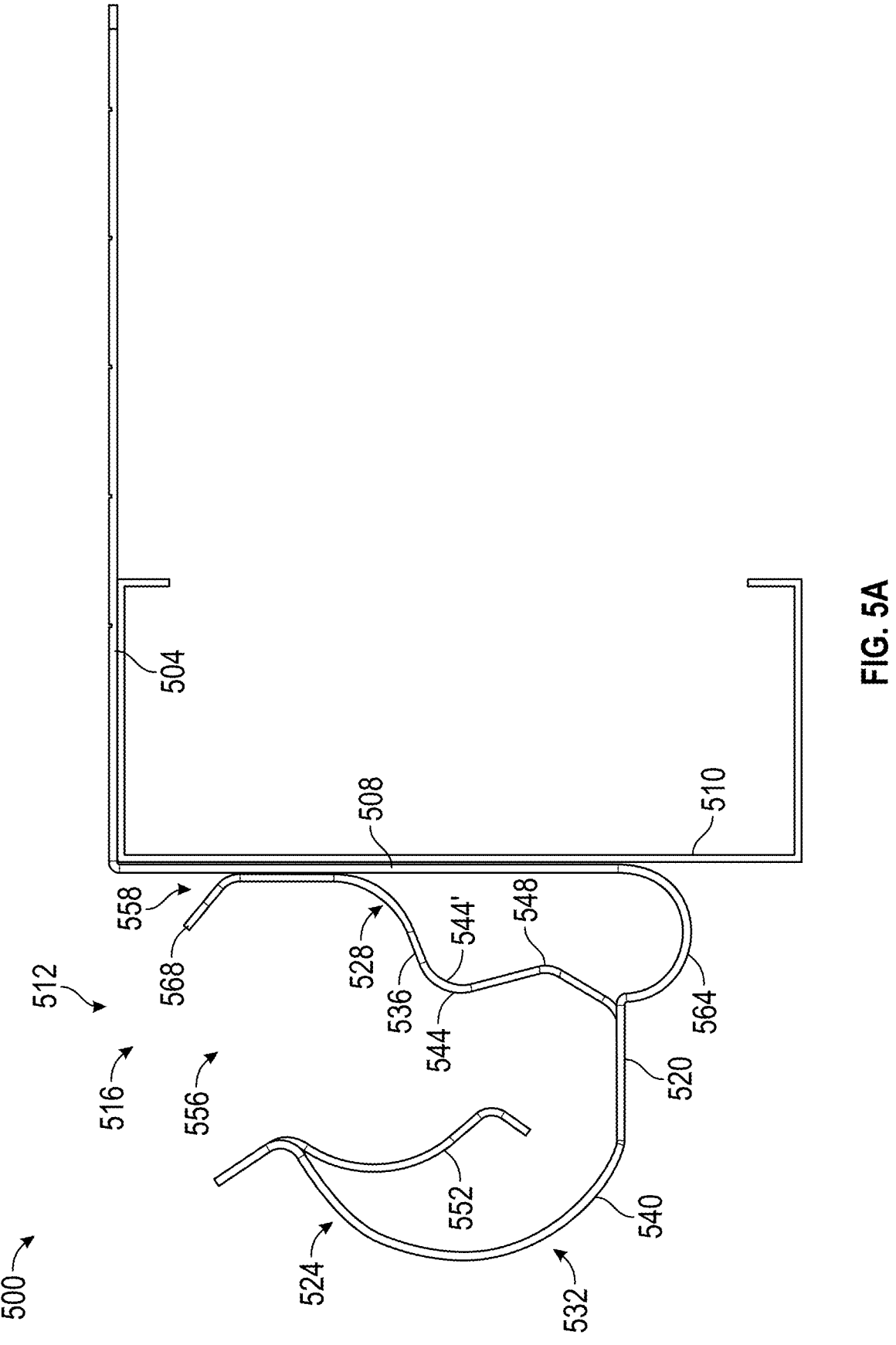
FIGS. 5A through 5C ("FIG. 5") are top plan and isometric views of another embodiment of the bracket to support cable or conduit according to an example of the disclosed technology.
Figure 5B:
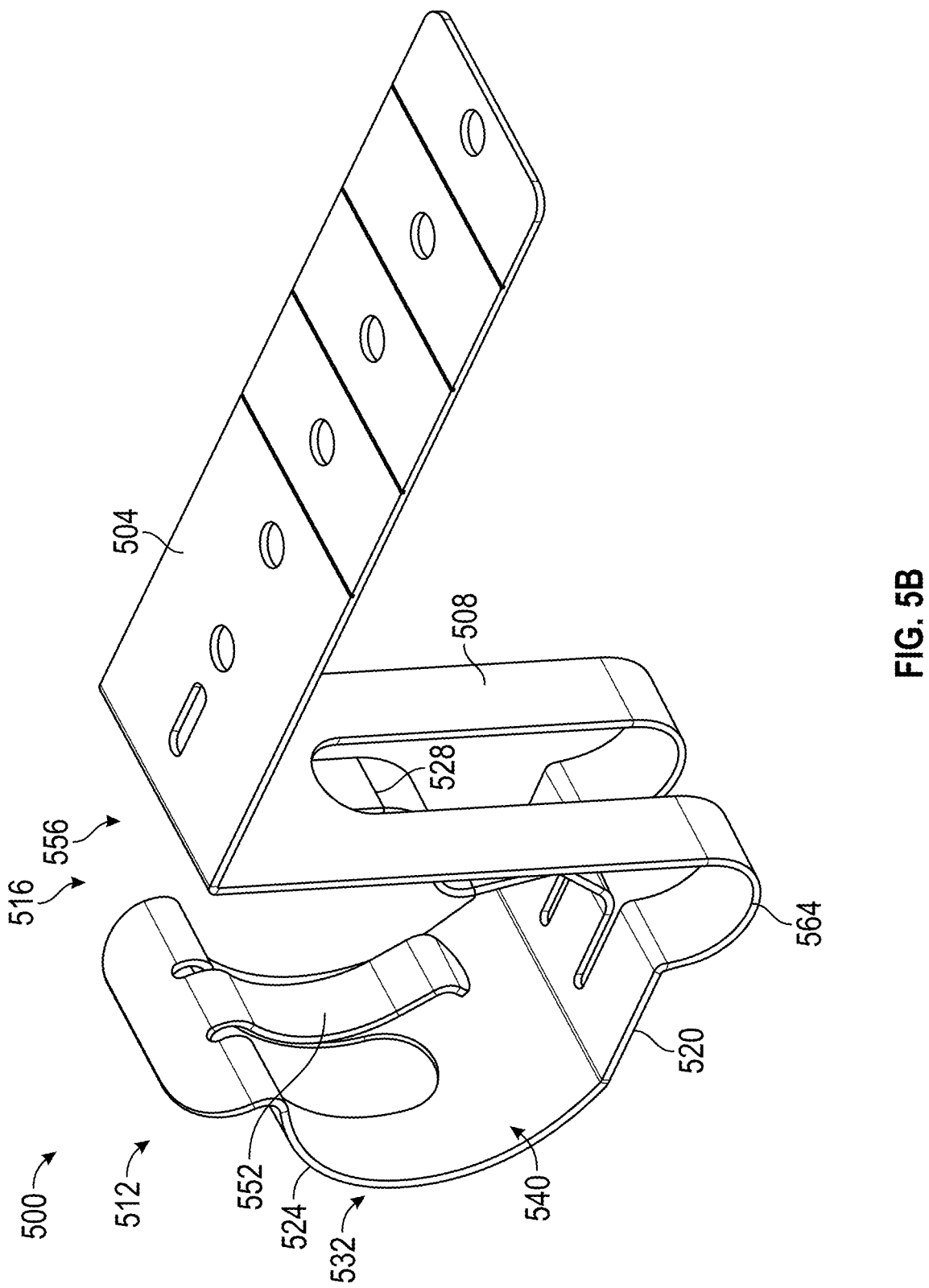
Figure 5C:
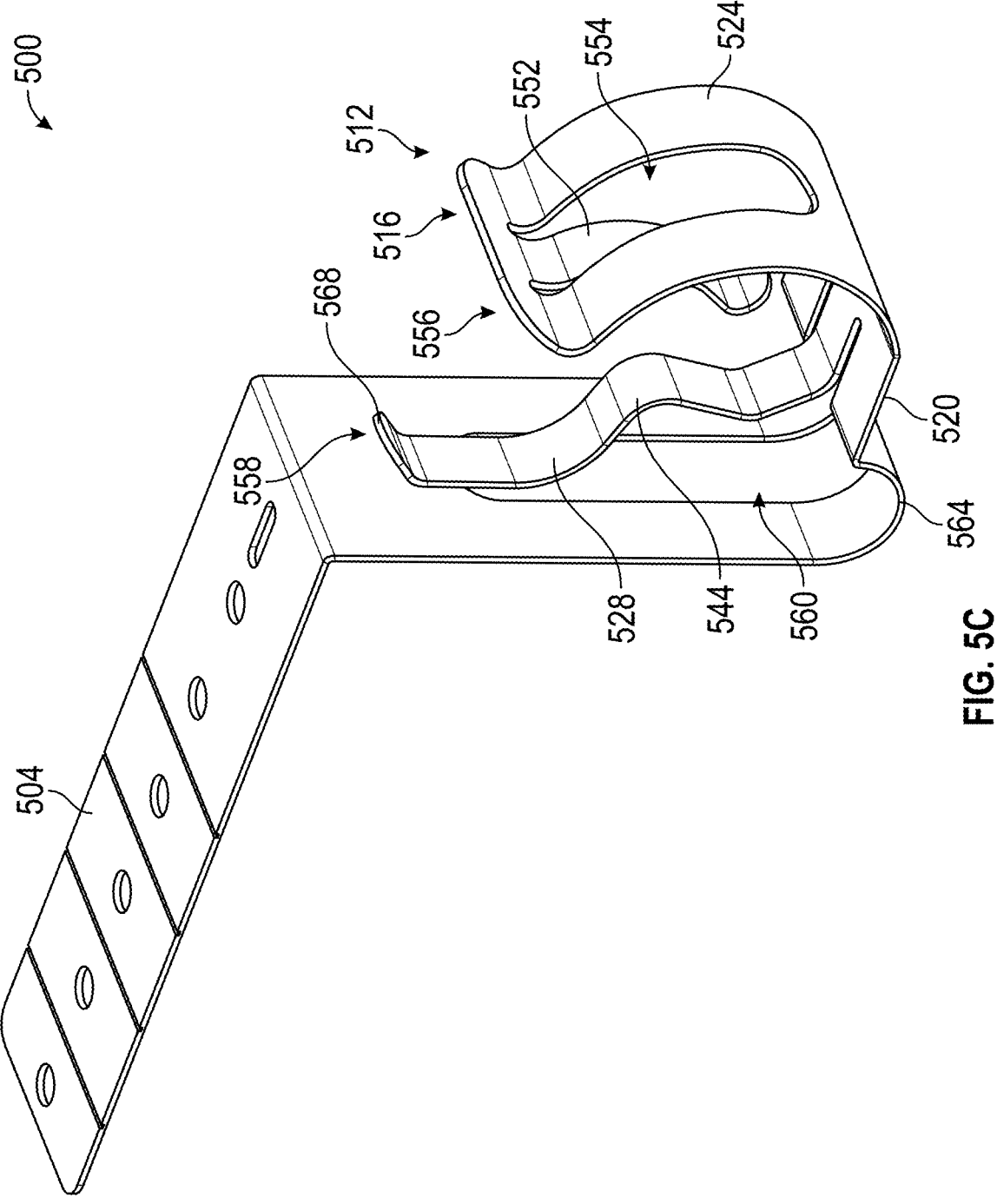

In another example embodiment of a stud-mounted bracket 500 shown in FIG. 5 (i.e., FIGS. 5A-5C), the bracket 500 includes similar components as the bracket 100 of FIG. 1 numbered in the 500 series. Thus, discussion above for the bracket 100 applies to the bracket 500 of FIG. 5 unless otherwise limited or required. For example, the bracket 500 includes a stud attachment portion 504, a leg 508, a base 520, an outer arm 524, an inner arm 528, a support passage 516, an outer support profile 532, an inner support profile 536, a first concave curved portion 540, a first convex curved portion 544, a corresponding concave portion 544', a second concave curved portion 548, a cut out 554, a first entrance 556, a second entrance 558, and an opening 560, and discussion above of similarly numbered and named components similarly applies. As such, the bracket 500 can be attached to a stud 510 (e.g., a metal stud), similar to the bracket 100 and the stud 210 of FIG. 2.

In some cases, as generally noted above, a pocket, or a first concave portion of a base of the stud-mounted bracket, can be provided. For example, as shown in FIG. 5, a concave portion 564 of the base 520 of the example bracket 500 can curve away or otherwise extend in a concave profile relative to the support passage 516. In some examples, the pocket includes a diameter that allows a cable to be received and secured within the pocket. In some examples, the inner arm 528 can resiliently flex to admit and secure a cable or conduit, and the second concave curved portion 548 can secure cable within the pocket (see, e.g., FIG. 7B) while also providing increased overall stiffness to the inner arm 528.

Additionally, in some embodiments, as generally noted above, a tab of an inner arm of the bracket can be provided. The tab 568 of the inner arm 528 of the example clip 512 angles toward the outer arm 524 and away from the support leg 508 and can be resiliently flexed to accommodate the insertion of a cable or conduit through the second entrance 558 of the support passage 516, as discussed in greater detail below.

In some examples, insertion of cable or conduit may urge the tab 568 toward or along the support leg 508. In such examples, the inner arm 528 may also be resiliently translated in a direction parallel to the support leg 508, with corresponding deformation of the inner arm 528 (e.g., similar to a leaf spring). Thus, insertion of a large conduit or cable into the support passage 516 may be aided (e.g., difficultly of insertion decreased) by resilient deformation of the tab 568—and the inner arm 528 generally—along the support leg 508. In different examples, an inner arm may resiliently translate or deflect at various locations along the inner arm, and in some cases primarily at portions of the inner arm that have relatively large radii of curvature.

Still referring to the illustrated examples of FIG. 5, the support clip 512 can further include a reduction finger 552 that extends rearwardly from the outer arm 524 into the support passage 516. In some embodiments, such as the example depicted in FIG. 5, the reduction finger may extend from an end of the outer arm 524. Additionally, in some embodiments, the reduction finger 552 may include a concave curvature relative to the inner arm 528 and the support leg 508. This arrangement can allow the support clip 512 to support, with the reduction finger 552 and the first convex curved portion 544, a cable or conduit. In other examples, a reduction finger can otherwise extend to resiliently secure smaller-diameter cable or conduit within a support passage.

Figure 6A:
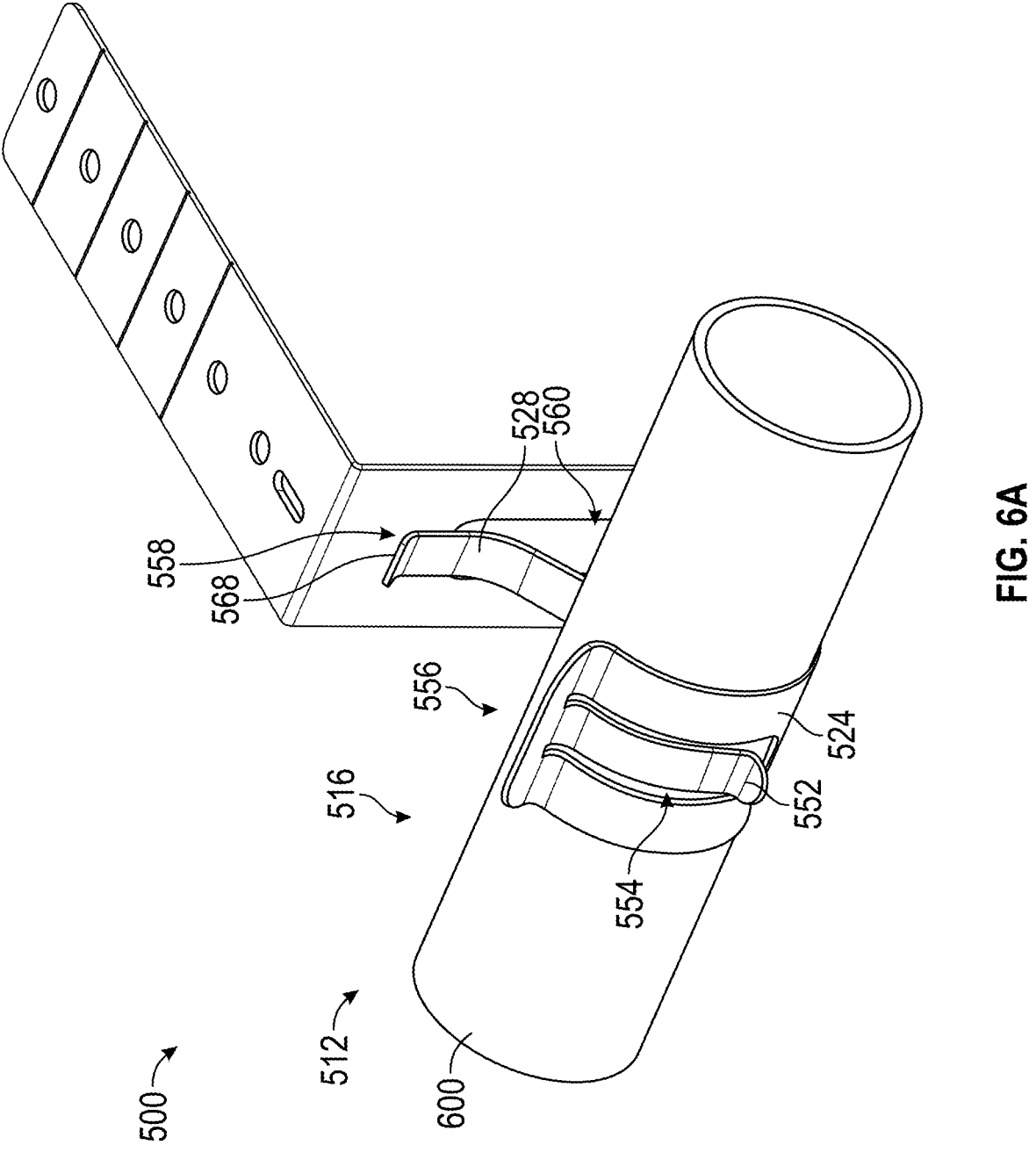
FIGS. 6A and 6B ("FIG. 6") illustrate isometric and top plan views of the bracket of FIG. 5 supporting a conduit.
Figure 6B:
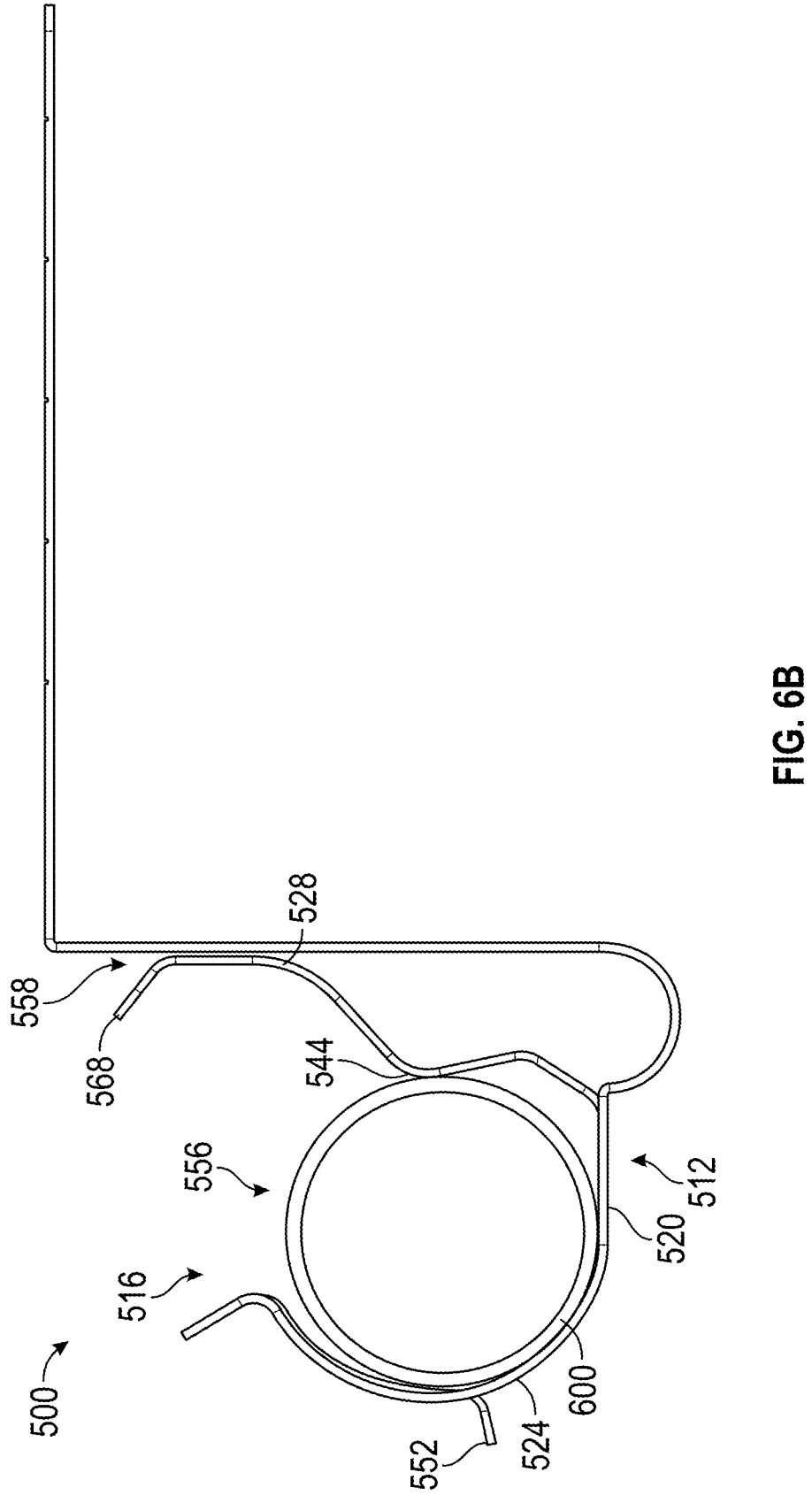

FIG. 6 (i.e., FIGS. 6A and 6B) illustrated the stud-mounted bracket 500 according to an example installed configuration. In the illustrated example, the support clip 512 holds a relatively large conduit 600 (e.g., a 1" electric metallic tube (EMT) conduit) in the support passage 116 and can be secured to a metal stud (e.g., the stud 510 of FIG. 5A), which may be identical to or different from the example stud 210 FIG. 2B. As shown, the outer arm 524 (e.g. main retainer clamp arm) and the inner arm 528 hold the conduit 600, so that the conduit 600 is between the outer support profile 532 and inner support profile 536 (see FIG. 5). As shown in FIG. 6, when the support clip 512 holds the conduit 600, the inner arm 528 can contact the support leg 508 both to further secure the conduit 600 in the support passage 516 and to prevent interference with a stud (see, e.g., FIG. 2B and FIG. 5A) (e.g., rather than the inner arm 528 extending through the opening 560).

As stated above, in some embodiments, for larger conduits, for support of multiple diameters or cable, the outer arm 524 can flex resiliently outward to allow a conduit to enter the support clip 112 and clamp the conduit or cable once the conduit or cable is seated. Further in this regard, an outwardly flared profile at the distal end of the outer arm 524 can assist users in easily introducing cable or conduit into the support passage 516. A similarly flared profile on the reduction finger 552 can be similarly useful, including as can help the reduction finger 552 to be easily deflected to the outside of the outer arm 524 through the cut outing 554 to accommodate larger-diameter cable or conduit.

Figure 7A:
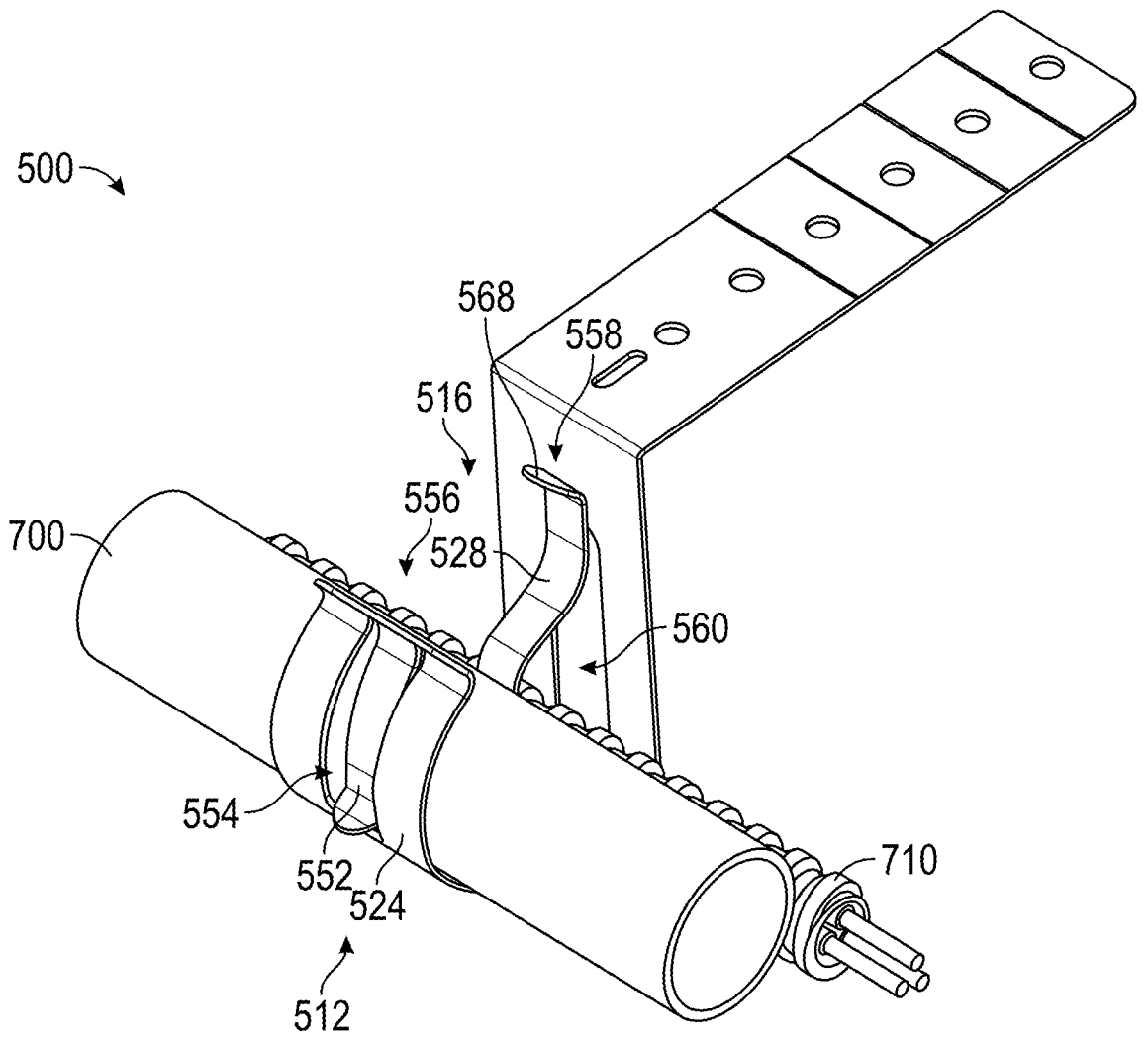
FIGS. 7A and 7B ("FIG. 7") illustrate isometric and top plan views of the bracket of FIG. 5 supporting conduit and a cable of different sizes.
Figure 7B:
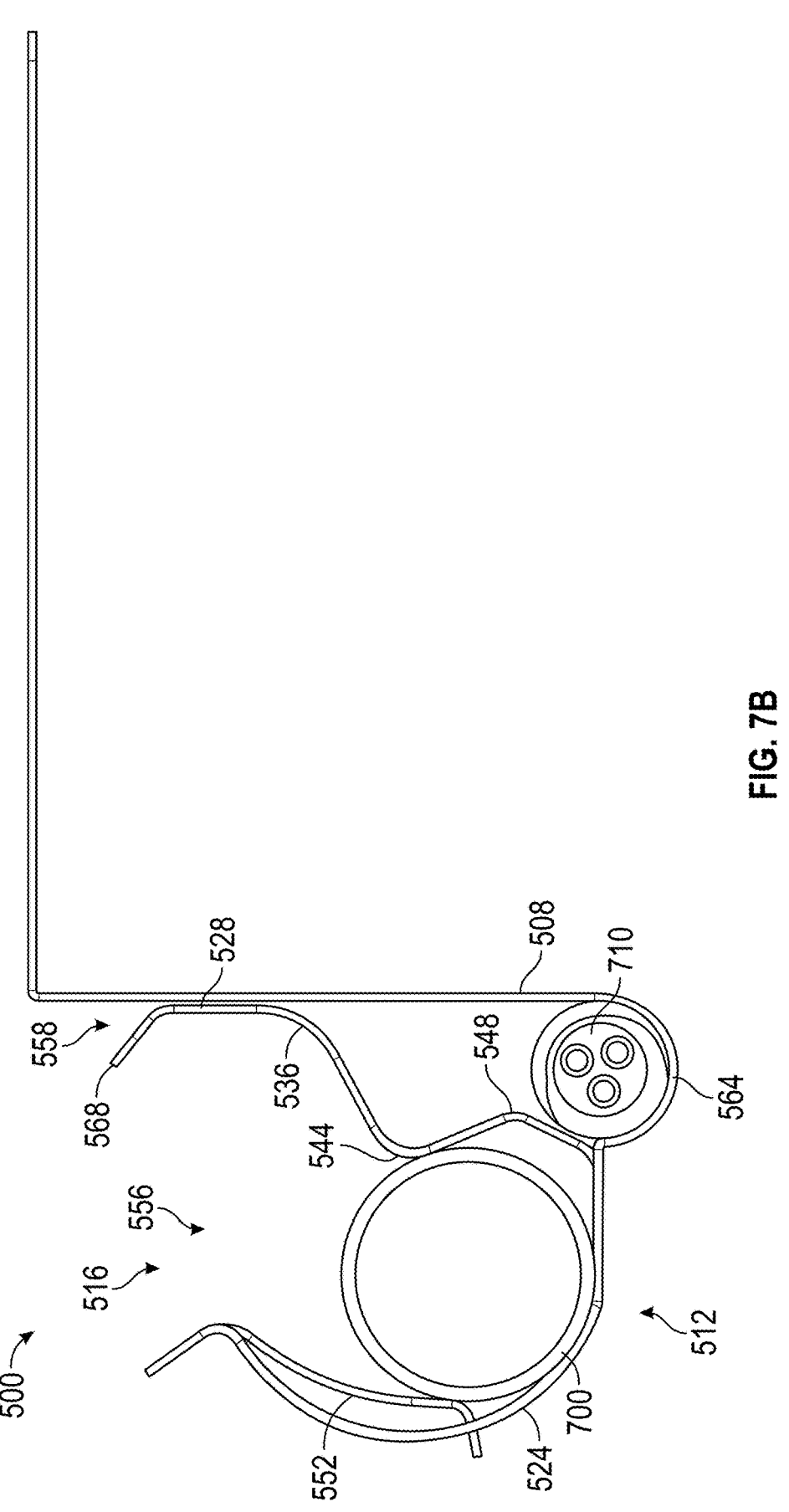

FIG. 7 (i.e., FIGS. 7A and 7B) illustrate the bracket 500 installed according to another example configuration. In the illustrated example, the support clip 512 holds a cable or conduit 700 of a larger diameter in the support passage 516 and a cable or conduit 710 of a smaller diameter between the inner arm 528 and the support leg 508. In the illustrated embodiment, the cable or conduit 710 can be supported within the concave portion 564 (and the corresponding pocket). Thus, for example, the support clip 512 can simultaneously support a 1" EMT conduit (as shown), a ¾" EMT conduit and a ½" AC or MC cable, or other sets of cable or conduit.

In particular, as shown, the larger of the conduit or cable can be received into a first entrance 556 the support passage 516 to be secured between the reduction finger 552 and the first convex curved portion 544 of the inner arm 528 (see FIG. 5). The smaller of the conduit or cable can be received into a second support entrance 558 between the inner arm 528 and the support leg 508, to be secured by the concave portion 564 of the base 520. In other examples, however, other configurations are possible (e.g., with different numbers of, or differently sized or arranged cable or conduit). For example, in some configurations, a ½" cable or conduit can be similarly secured within the support passage 516, between the reduction finger 552 and the first convex curved portion 544 of the inner arm 528. In some embodiments, the conduit or cable 700 may be received by the support passage 516 via the entrance 556 first in time, and the conduit or cable 710 may be received by the support passage 516 via the entrance 558 second in time. In other embodiments, the conduit or cable 710 may be received by the support passage 516 via the entrance 558 first in time, and the conduit or cable 700 is received by the support passage 516 via the entrance 556 second in time.

Additionally, in the example confirmation of FIG. 7, the tab 568 can be utilized to receive a conduit or cable into the support passage 516, as discussed above. The tab 568 can be resiliently flexed outward (e.g., away from the support leg 508) to allow the support passage to receive a conduit (e.g., a conduit or cable 710) via the second entrance 558. Correspondingly, the cable 710 can be inserted between an inner side of the inner arm 528 (i.e., a side facing towards the support leg 508) and the support leg 508. Further, in some examples, the tab 568 can be resiliently flexed inward (e.g., toward from the support leg 508) to allow the support passage to receive a conduit or cable (e.g., a conduit or 700) via the first entrance 556. Still further, in some embodiments, the conduit 700 may be received in the support passage 516 to resiliently flex the inner arm 528 outward into contact with the support leg 508, with corresponding additional securement of the conduit 700 within the support passage 516.

Figure 8A:
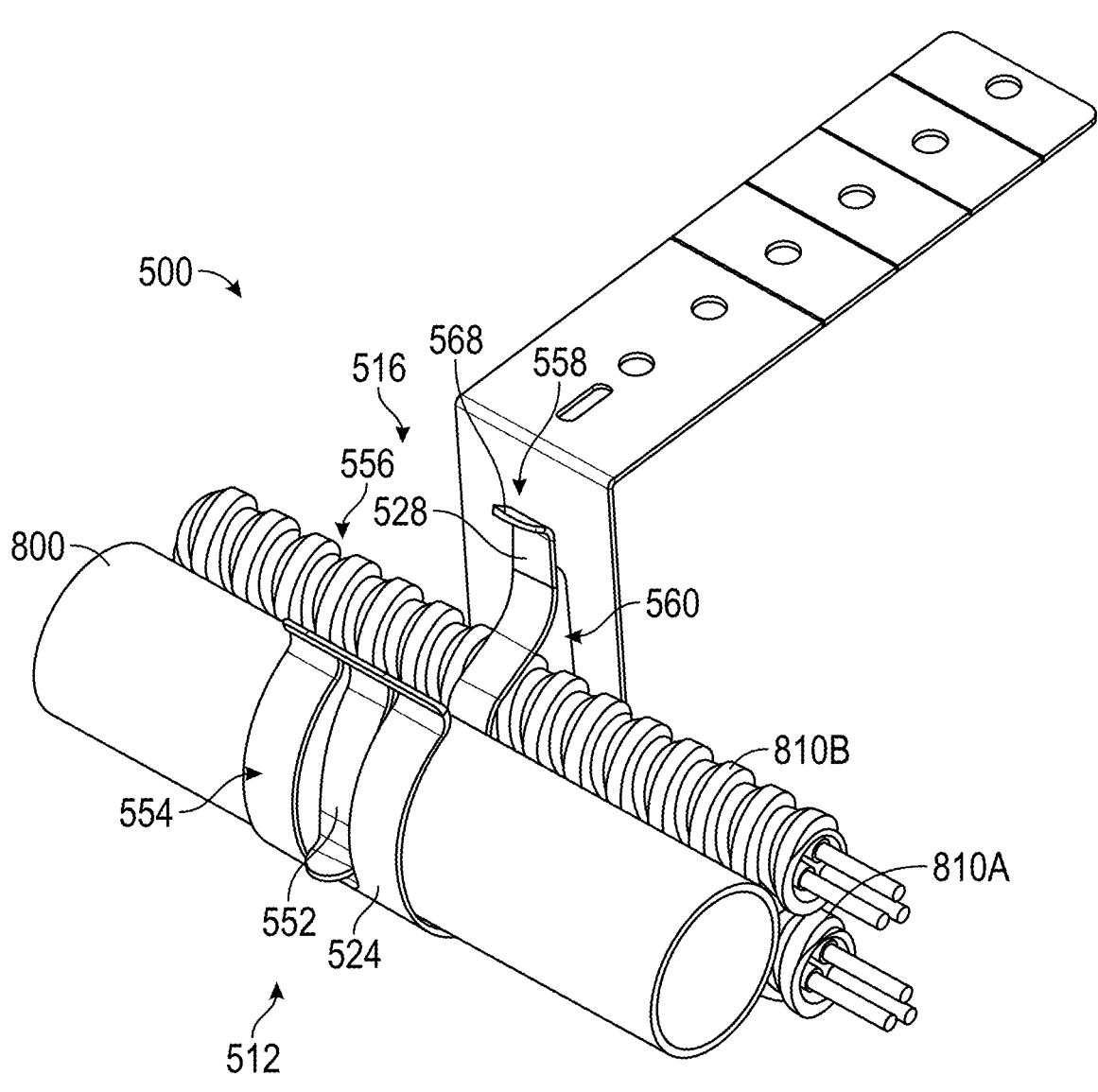
FIGS. 8A and 8B ("FIG. 8") illustrate isometric and top plan views of the bracket of FIG. 5 supporting conduit and multiple cables of the sizes shown in FIG. 7.
Figure 8B:
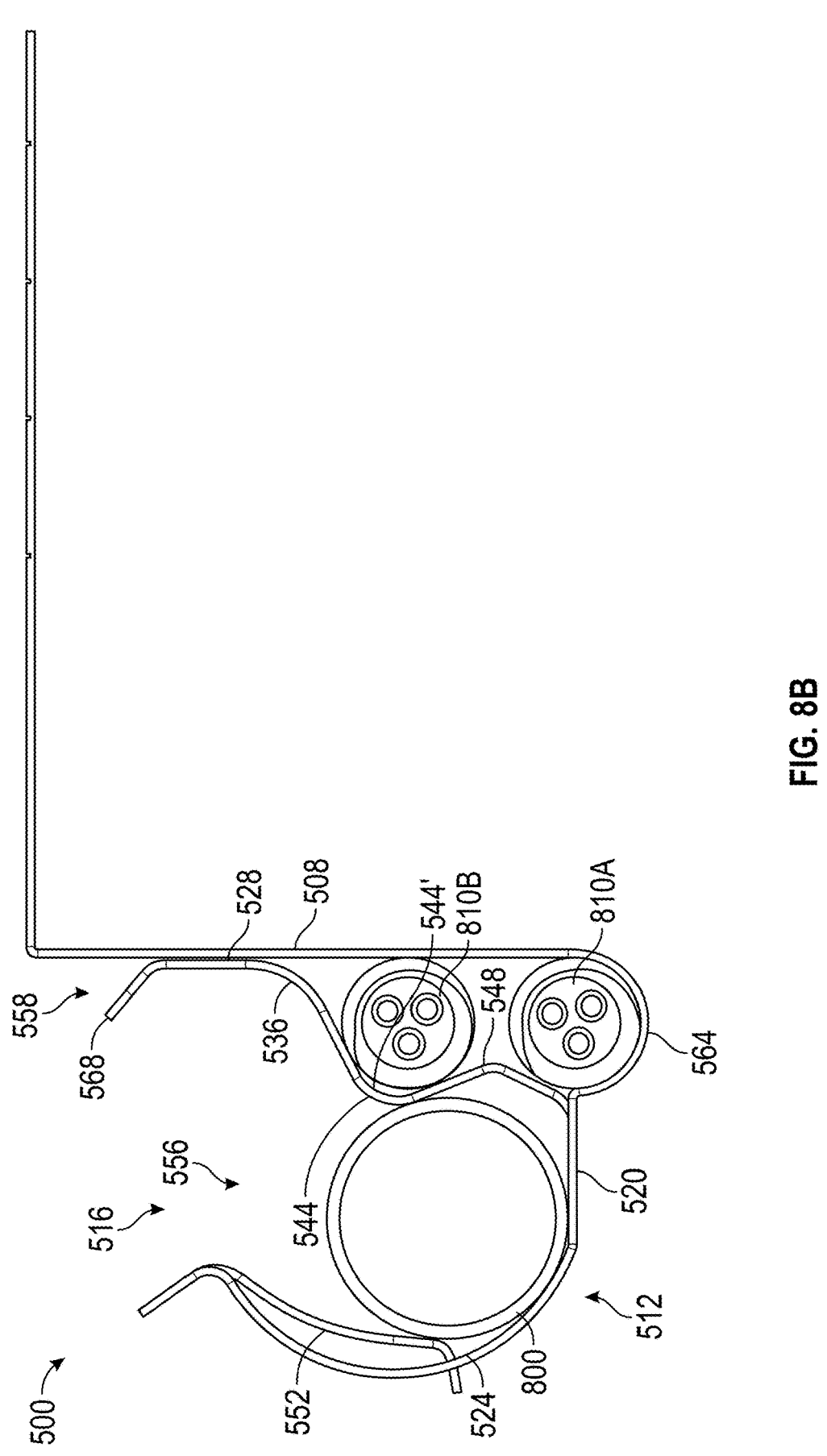

FIG. 8 (i.e., FIGS. 8A and 8B) illustrate the bracket 500 installed according to another example configuration. In the illustrated example, the support clip 512 holds a cable or conduit 800 of a larger diameter in the support passage 516 and a cable or conduit 810A of a smaller diameter between the inner arm 528 and the support leg 508 within the concave portion 564 of the base 520 (e.g., with larger diameter being smaller than the larger diameter of FIG. 7, and the smaller diameter being substantially equal to the smaller diameter of FIG. 7). Additionally, in the illustrated example bracket 500 of FIG. 8, the support clip 512 holds an additional cable or conduit 810B with the smaller diameter between the inner arm 528 and the support leg 508. The cable or conduit 810B is supported between the support leg 508 and the concave curved portion 544'. In other embodiments, the cable or conduit 810B can have a diameter larger or smaller than the diameter of the cable or conduit 810A. Additionally, in some examples, the second concave curved portion 548 can create separation (e.g., spacing) between the cable or conduit 810A and the cable or conduit 810B.

Similar to the example configuration of FIG. 7, the tab 568 of the example configuration of FIG. 8 can be resiliently flexed inward or outward to allow the support passage 516 to adaptably receive multiple conduits or multiple cables (e.g., conduit or cable 700, 710, separately received through the first and second entrances 556, 558 in various orders). Additionally, in some embodiments, the cable or conduit 800 may further secure at least the cable or conduit 810B once the cable or conduit 800 is received by the support passage, as the cable or conduit 800 can contact and push against the resilient inner arm 528, in turn contacting the concave curved portion 544' against the cable or conduit 810B (and vice versa).

In some installations of the example configuration of FIG. 8, the cable or conduit 800 may be received by the support passage 516 first in time, followed by the cable or conduit 800A and cable or conduit 800B. In other embodiments, the cable or conduit 800A may be received by the support passage first in time, followed by the cable or conduit 800 and then the cable or conduit 800B. In other embodiments, the cable or conduit 800A may be received by the support passage, followed by the cable or conduit 800B and then the cable or conduit 800.

Figure 9A:
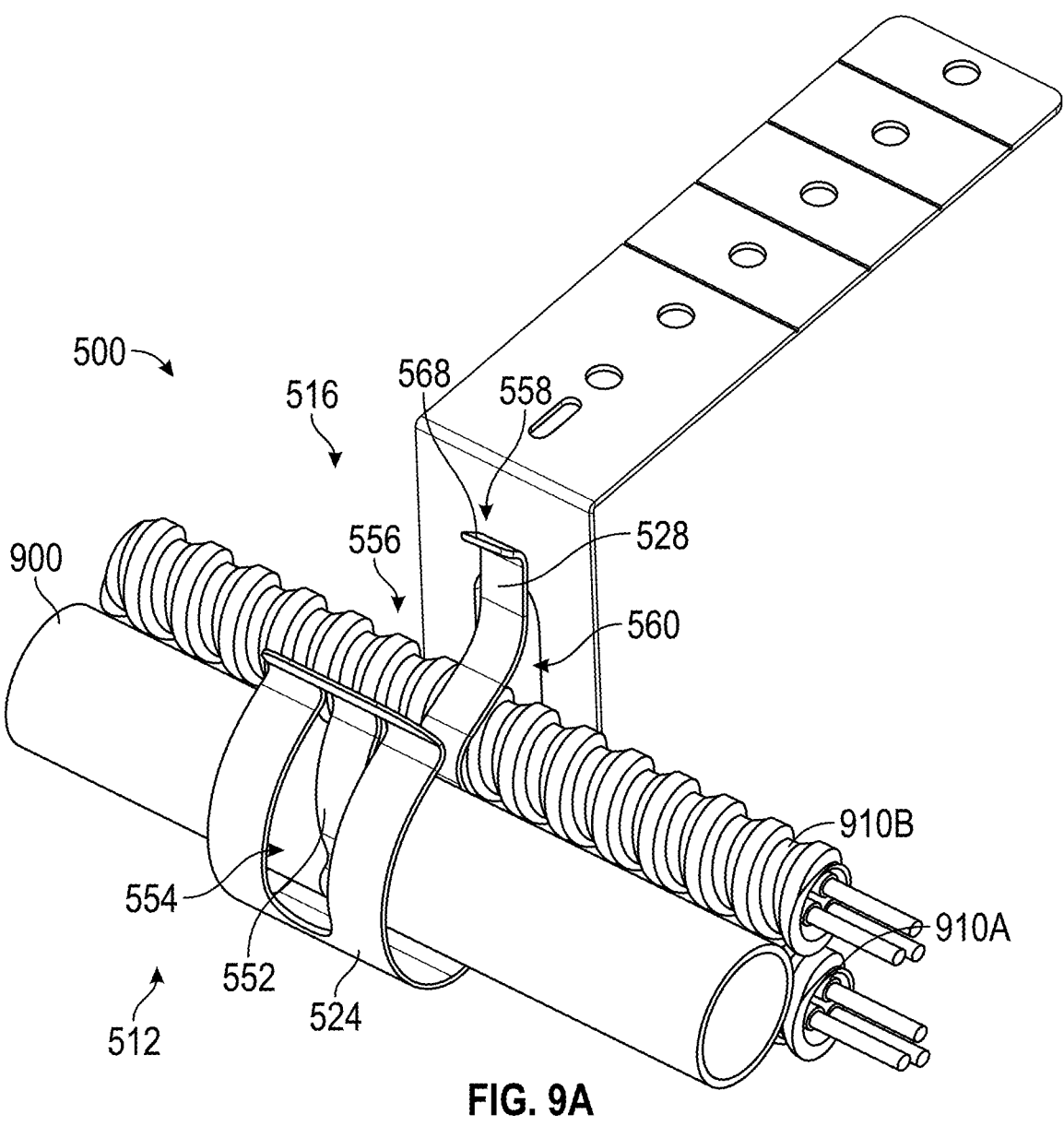
FIGS. 9A and 9B ("FIG. 9") illustrate isometric and top plan views of the bracket of FIG. 5 supporting cables of the size shown in FIGS. 7 and 8 and conduit of a different size.
Figure 9B:
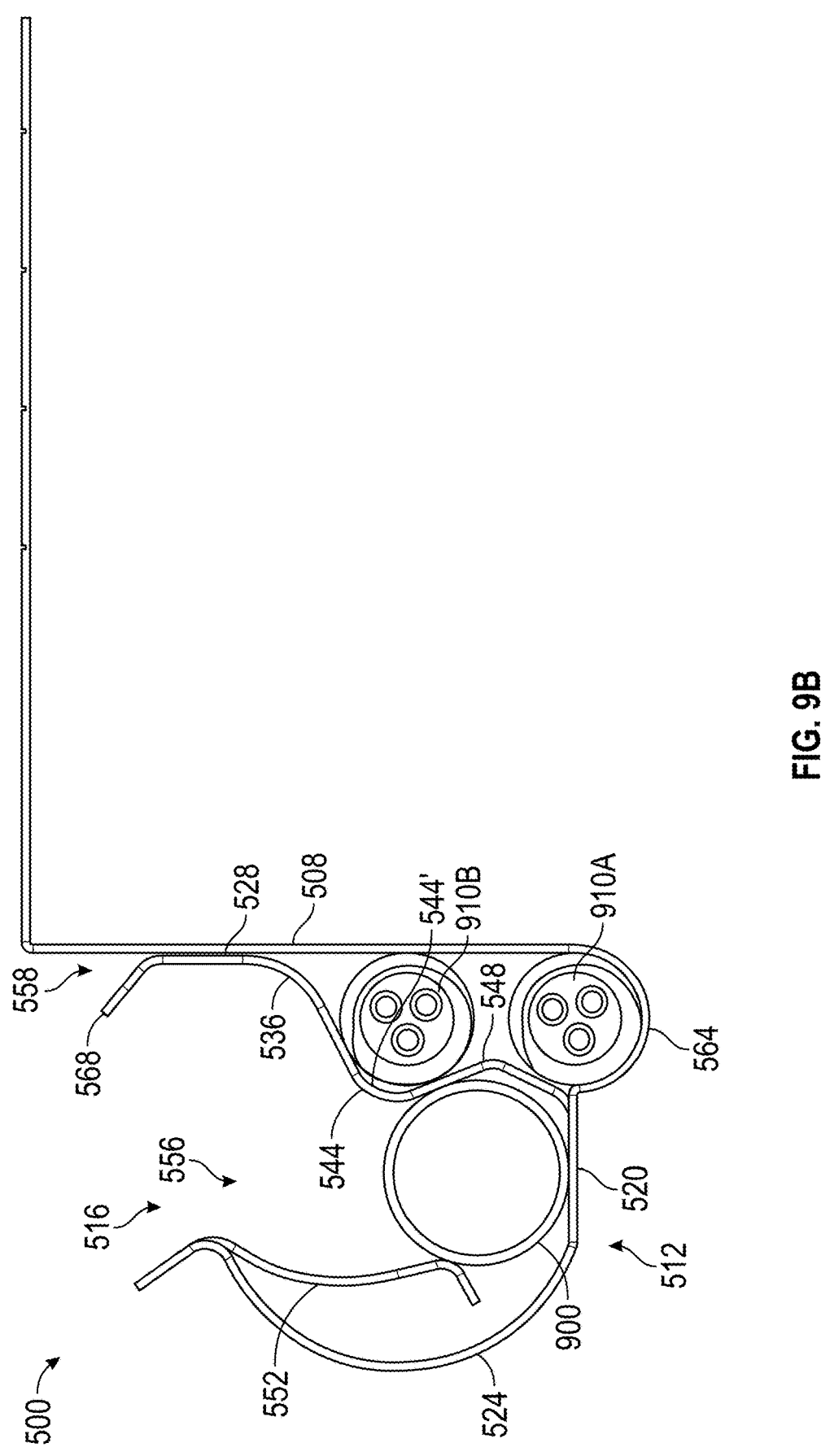

FIG. 9 (i.e., FIGS. 9A and 9B) illustrate the bracket 500 installed according to another example configuration. In the illustrated example, the support clip 512 holds a cable or conduit 900 of a larger diameter in the support passage 516 and a cable or conduit 910A of a smaller diameter between the inner arm 528 and the support leg 508 within the concave portion 564 of the base 520 (e.g., with the larger diameter being smaller than the larger diameter of FIG. 8 and the smaller diameter being substantially equal to the smaller diameter of FIG. 8). Additionally, in the illustrated example, the support clip 512 holds another cable or conduit 910B of smaller diameter between the concave curved portion 544' and the support leg 508.

Figure 10A:
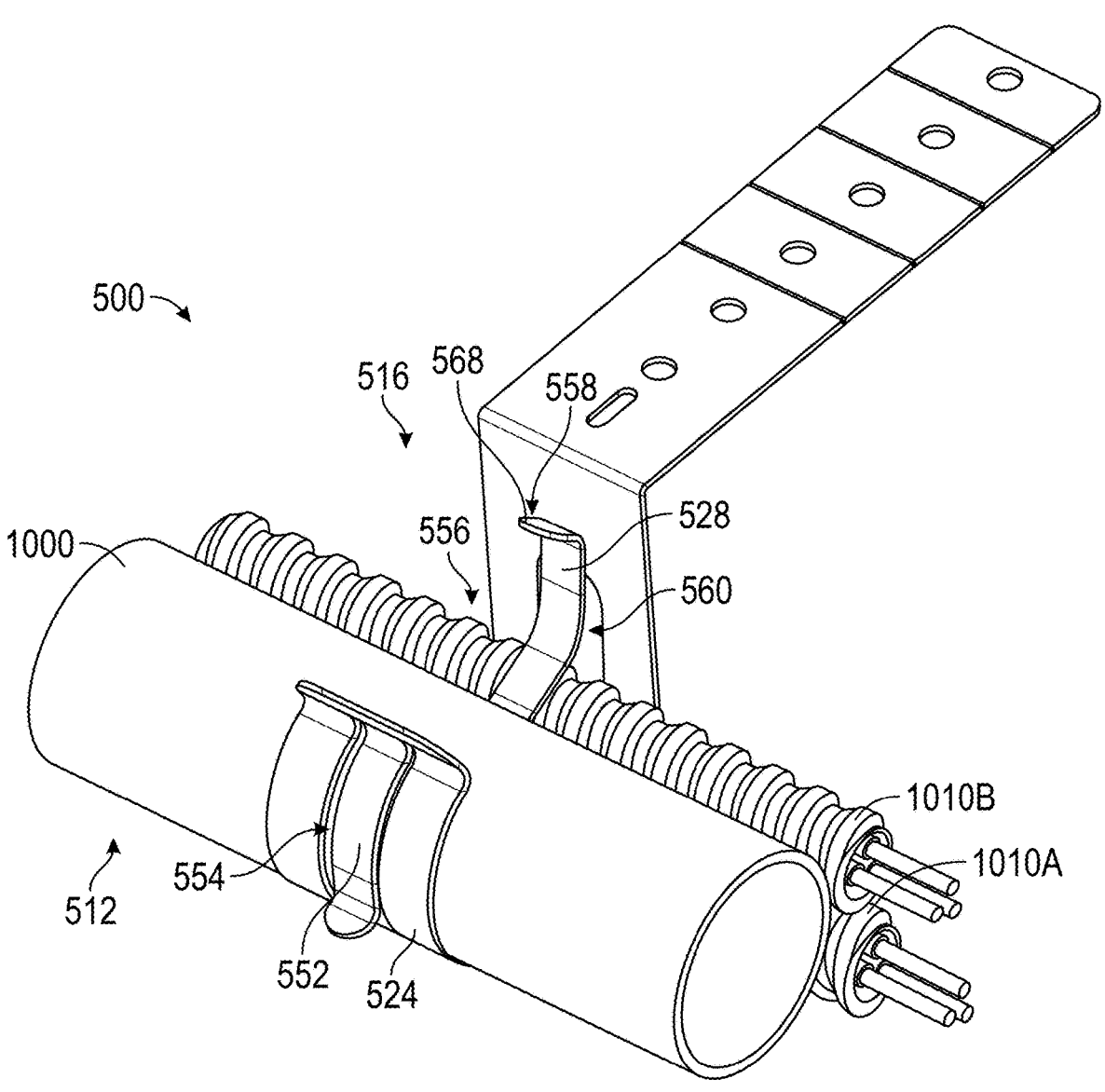
FIGS. 10A and 10B ("FIG. 10") illustrate isometric and top plan views of the bracket of FIG. 5 supporting conduit of the size shown in FIG. 6 and cables of the size shown in FIG. 7.
Figure 10B:
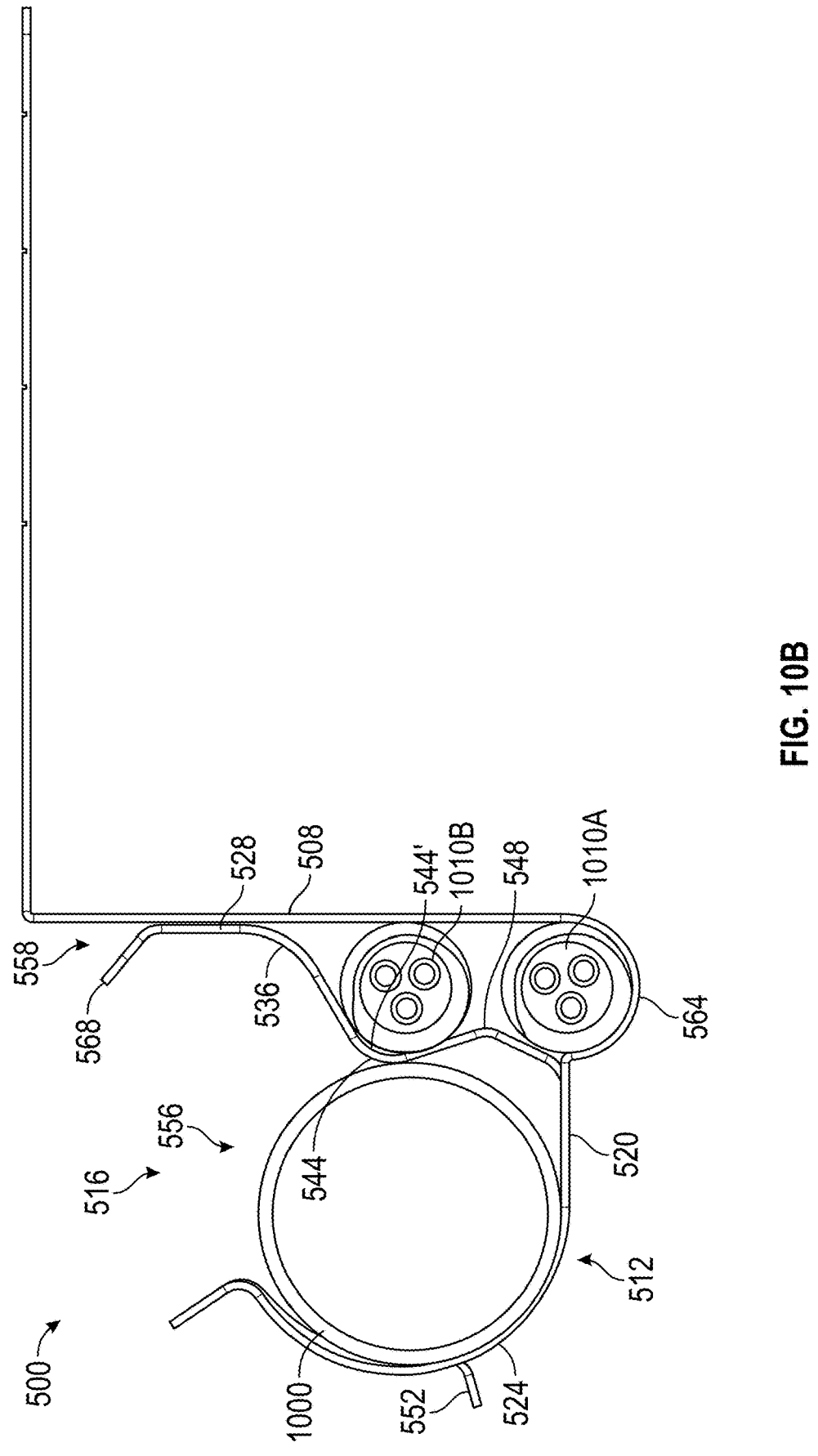

Similarly, FIG. 10 (i.e., FIGS. 10A and 10B) illustrate the bracket 500 installed according to another example configuration. In the illustrated example, the support clip 512 holds a cable or conduit 1000 of a larger diameter in the support passage 516 and a cable or conduit 1010A of a smaller diameter between the inner arm 528 and the support leg 508 within the concave portion 564 of the base 520 (e.g., with the larger diameter being substantially equal to the larger diameter of FIG. 6 and the smaller diameter being substantially equal to the smaller diameter of FIG. 7). Additionally, in the illustrated example, the support clip 512 holds another cable or conduit 1010B of smaller diameter between the concave curved portion 544' and the support leg.

For the configurations discussed herein, installation may be implemented with various orders of operations, including with cable or conduit installed into a relevant bracket before or after the bracket is secured to a stud, another building structure, or another component of a larger assembly. For example, cable or conduit may be installed into a bracket before or after the conduit or cable is installed on a box (e.g., electrical junction box) that is secured to a building structure, or a stud. The bracket may be then—or previously—be attached to a stud or other building structure (e.g., with a nail or threaded fastener), to support the conduit or cable relative to the building structure.

In such examples, the bracket may thus generally define and maintain a gap between the secured conduit or cable and the stud or other building structure, thereby advantageously maintaining a position of the cable or conduit for the larger assembly (e.g., with appropriate offset relative to a stud). Correspondingly, in some examples, a stud attachment portion of the bracket may include one or more apertures to allow the bracket to be secured to the stud with varying offsets (e.g., sizes of gaps) between the conduit or cable and the stud.

Figure 11A:
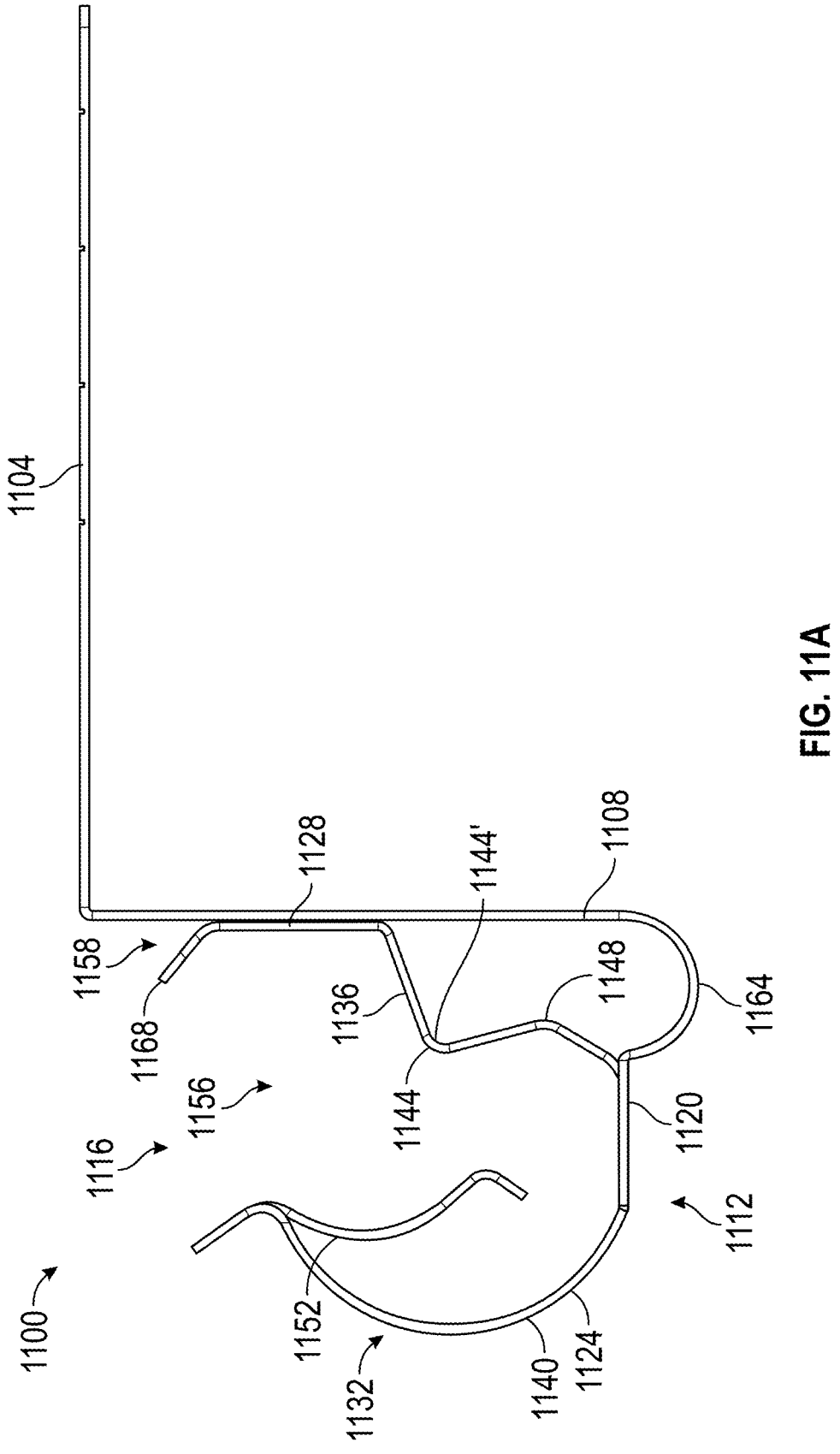
FIGS. 11A through 11C ("FIG. 11") are top plan and isometric views of another configuration of the bracket of FIG. 5.
Figure 11B:
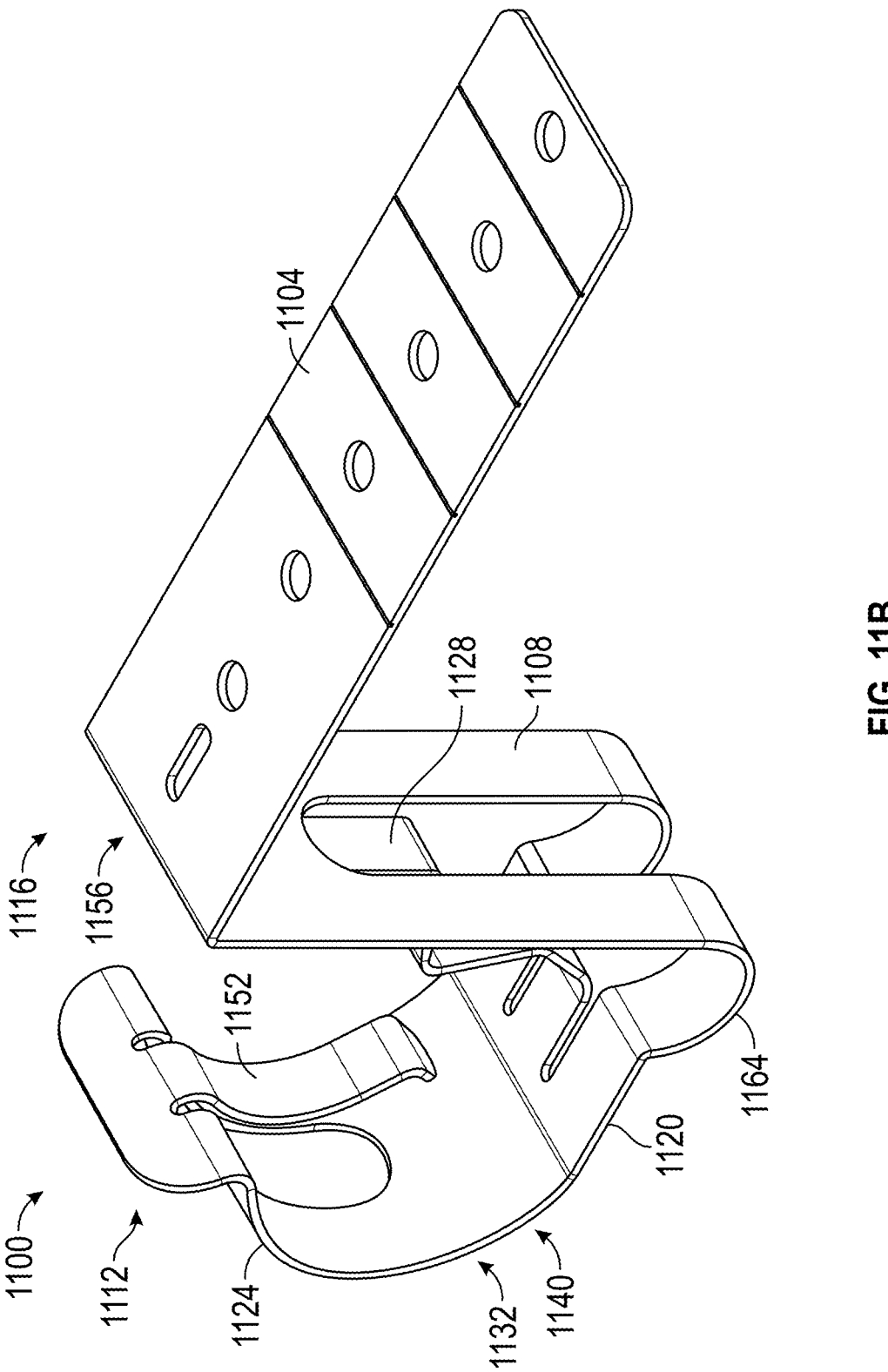
Figure 11C:
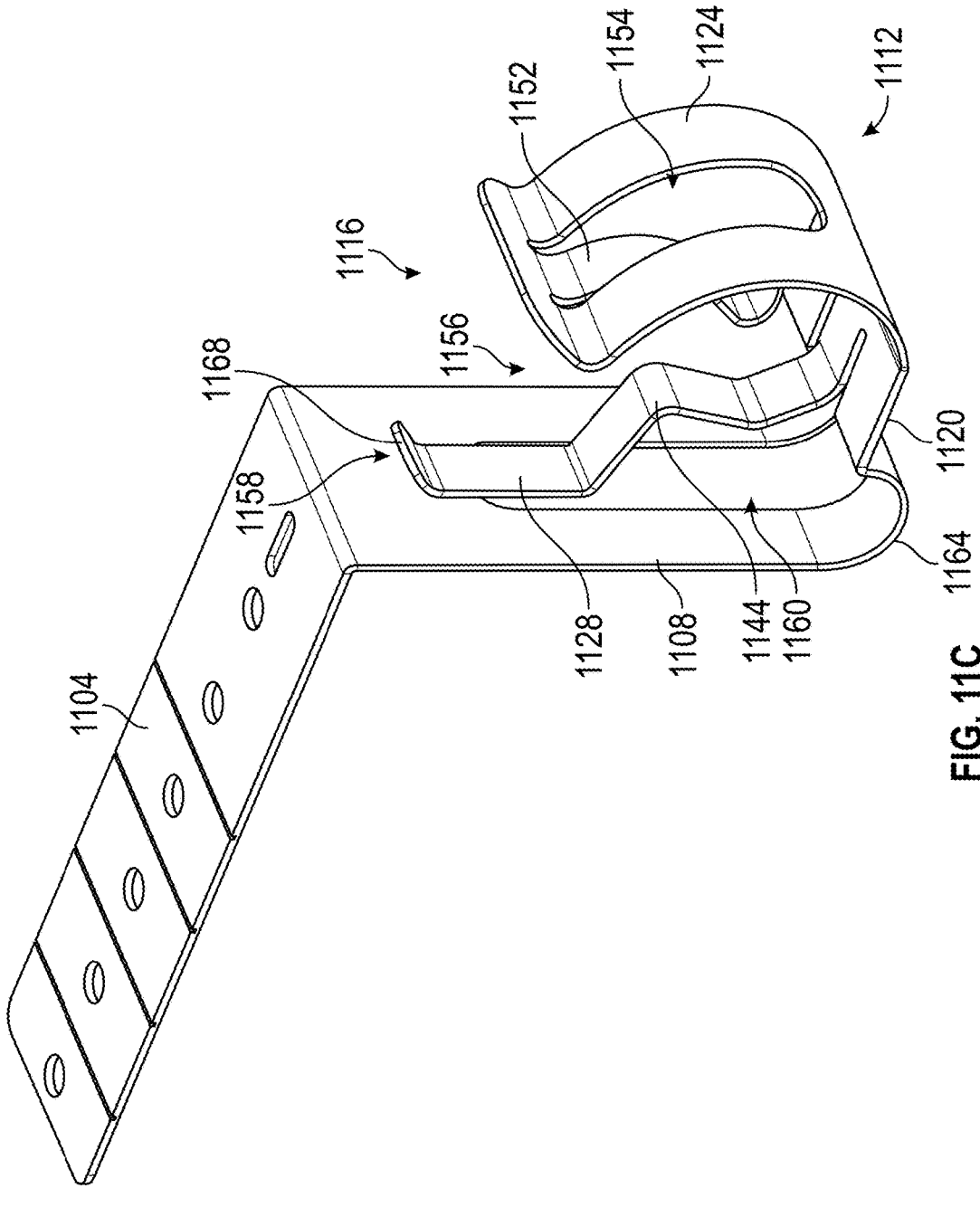

In some embodiments of a stud-mounted bracket, inner arm or outer arms of a clip may include differently shaped convex or concave portions (e.g., less curved, more angled, etc.). For example, as shown in FIG. 11 (i.e., FIGS. 11A-11C), a clip 1112 of a stud-mounted bracket 1100 can include an inner arm 1128 with a first convex curved portion 1144 with smaller radius bends than the first convex curved portion 544 of FIG. 5. Further, other variations are possible (e.g., with smaller or larger radius bends at various points along any variation of inner or outer arms).

Except as noted above, the bracket 1100 includes substantially similar components as the bracket 500 of FIG. 5 numbered in the 1100 series. Thus, discussion above for the bracket 500 also applies to the bracket 1100 of FIG. 11 unless otherwise limited or required. For example, the bracket 1100 includes a stud attachment portion 1104, a leg 1108, a support clip 1112, a support passage 1116, a base 1120, an outer arm 1124, an inner arm 1128, an outer support profile 1132, an inner support profile 1136, a first concave curved portion 1140, a first convex curved portion 1144, a corresponding concave curved portion 1144', a second concave curved portion 1148, a reduction finger 1152, a cut out 1154, a first entrance 1156, a second entrance 1158, an opening 1160, a concave portion 1164 of the base 1120, and a tab 1168.

Thus, embodiments of the disclosure can provide an improved bracket for securing cable or conduit relative to building structure. For example, some configurations of the disclosed technology can adaptably and resiliently receive and secure cable or conduit of a variety of sizes, including multiple cable or conduit simultaneously, without undue interference with building structure.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," "upper," "lower," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features for a particular embodiment, regardless of the absolute orientation of the embodiment (or relative orientation relative to environmental structures). "Lateral" and derivatives thereof generally indicate directions that are generally perpendicular to a vertical or axial direction for a relevant reference frame (e.g., extending in a radial direction relative to a reference axis).

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

As used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Unless otherwise limited or defined, the terms "about" and "approximately," as used herein with respect to a reference value, refer to variations from the reference value of ±20% or less (e.g., ±15, ±10%, ±5%, etc.), inclusive of the endpoints of the range. Similarly, as used herein with respect to a reference value, the term "substantially equal" (and the like) refers to variations from the reference value of less than ±5% (e.g., ±2%, ±1%, ±0.5%) inclusive.

Unless otherwise limited or defined, the term "diameter," as used herein with respect to a diameter of a conduit or cable, specifically that of electrical metallic tubing (EMT), refers to a nominal diameter of EMT conduit as defined by ANSI C80.3-1977. In this regard, actual measured diameter—in contrast to nominal diameter, as noted above—can be specified particularly as an "inner actual diameter" or an "outer actual diameter."

As used herein, unless otherwise limited or defined, directional terms are relative to a conventional stud installation, with a "front" face of a stud facing outward from a corresponding wall cavity (e.g., into a living or working space bounded by the relevant stud wall), and "forward" and "rearward" directions defined accordingly.

As used herein, unless otherwise limited or defined, the terms concave and convex indicate inward and outward hollows, respectively, along a particular side or surface of a body or sub-component of the body. In some cases, concave and convex surfaces can exhibit continuous curvature, with or without a varying radius/radii of curvature. In some cases, concave and convex surfaces can exhibit angled profiles that define part or all of the corresponding hollow. For stamped bodies and others, as reflected in the various figures and description above, inclusion of a concave surface on one side of a relevant portion of material may correspond to inclusion of a convex surface on an opposite side of the relevant portion of material, and vice versa. Accordingly, unless otherwise indicated in text or illustrations, discussion above of a convex feature on one side of a component (e.g., along an inner or outer arm) should be understood to indicate a corresponding concave feature on an opposite side of the component, and vice versa.

In some implementations, devices or systems disclosed herein can be utilized, manufactured, installed, etc. using methods embodying aspects of the disclosed technology. Correspondingly, any description herein of particular features, capabilities, or intended purposes of a device or system should be considered to disclose, as examples of the disclosed technology a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, should be understood to disclose, as examples of the disclosed technology, the utilized features and implemented capabilities of such device or system. Methods of the disclosed technology may be presented in some cases with operations listed in a particular order. Unless otherwise required or specified, the operations of such methods can be implemented in different orders, in parallel, or as selected sub-sets of one or more individual operations (e.g., with a particular listed operation being implemented alone, rather than in combination with others).

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

I claim:

1. A stud-mounted bracket to support cable or conduit relative to an electrical box, the stud-mounted bracket comprising:
   a stud attachment portion securable to a stud of a building;
   a support leg that extends integrally from the stud attachment portion at a first end of the support leg; and
   a support clip that extends integrally from a second end of the support leg to define a support passage for cable or conduit;
   the support clip integrally including:
      a base that extends from the support leg;
      an outer arm that extends from the base to define an outer support profile along an outer side of the support passage, relative to the support leg, the outer support profile including a first portion, concave relative to the support leg, oriented to support cable or conduit of a first diameter in the support passage; and
      an inner arm that extends from the base or the outer arm to define an inner support profile within the support passage, between the outer arm and the support leg, the inner support profile including:
         a first portion that is convex relative to the outer arm and oriented to support the cable or conduit of the first diameter on a first side of the inner arm that faces away from the support leg, in combination with the outer arm; and
         a second portion that extends from the first portion of the inner arm, is convex relative to the support leg, and is oriented to support cable or conduit of a second diameter, smaller than the first diameter, on a second side of the inner arm that faces toward the support leg.

2. The stud-mounted bracket of claim 1, wherein the base includes a first portion that is concave relative to the support passage and oriented between the inner arm and the support leg to receive the cable or conduit of the second diameter rearward of the second portion of the inner arm.

3. The stud-mounted bracket of claim 2, with the cable or conduit of the second diameter being a first cable or conduit of the second diameter, wherein the first portion of the inner arm is spaced from the support leg to resiliently support a second cable or conduit of the second diameter on the second side of the inner arm while the first cable or conduit of the second diameter is received within the first portion of the base.

4. The stud-mounted bracket of claim 1, the inner arm extends from the base.

5. The stud-mounted bracket of claim 1, wherein the support clip further includes a reduction finger that extends from the outer arm into the support passage to support the cable or conduit of the first diameter in combination with the first portion of the inner arm.

6. The stud-mounted bracket of claim 5, relative to the stud as secured to the stud attachment portion, the reduction finger extends rearwardly from the outer arm and the inner arm extends forwardly from the base or the outer arm.

7. The stud-mounted bracket of claim 5, wherein the reduction finger is aligned with a cut out in the outer arm to be resiliently deflectable through the outer arm to support a cable or conduit of a third diameter within the support passage, the third diameter being larger than the first diameter.

8. The stud-mounted bracket of claim 1, wherein the inner arm extends from a first end at the base or the outer arm to a second end; and wherein, along the inner arm, the second portion of the inner arm is between the first portion of the inner arm and the base.

9. The stud-mounted bracket of claim 1, wherein the inner arm extends from a first end, connected to the base or the outer arm, to a second end; and wherein the second end is aligned to contact the support leg, with the cable or conduit of the first diameter supported on the first side of the inner arm by the first portion of the inner arm.

10. The stud-mounted bracket of claim 9, wherein the contact of the second end with the support leg prevents the inner arm from extending through the support leg.

11. The stud-mounted bracket of claim 1, wherein the first diameter is a ¾ inch diameter.

12. The stud-mounted bracket of claim 11, wherein the second diameter is a ½ inch diameter.

13. The stud-mounted bracket of claim 12, wherein a reduction finger extends into the support passage and is resiliently deflectable to selectively support the cable or conduit of the first diameter or a cable or conduit of a third diameter, the third diameter being a 1 inch diameter.

14. The stud-mounted bracket of claim 1, wherein the inner arm is spaced from the outer arm and the support leg, and is resiliently deflectable to simultaneously support:

the cable or conduit of the first diameter on the first side of the inner arm, and multiple cables or conduits of the second diameter on the second side of the inner arm.

15. A bracket to support cable or conduit relative to an electrical box, the bracket comprising:

an attachment portion to secure the bracket to a building structure;

a support leg that extends from the attachment portion; and a support clip that extends from the support leg;

the support clip including:

an outer arm;

an inner arm that extends between the outer arm and the support leg; and a reduction finger;

the outer and inner arms collectively defining a first entrance to a support passage to resiliently support cable or conduit of a first diameter on a first side of the inner arm;

the inner arm and the support leg collectively defining a second entrance to the support passage to resiliently support cable or conduit of a second diameter, smaller than the first diameter, on a second side of the inner arm; and the reduction finger extending into the support passage to selectively support the cable or conduit of the first diameter or a cable or conduit of a third diameter larger than the first diameter.

16. The bracket of claim 15, wherein a base of the support clip forms a pocket at an end of the support passage to support a second cable or conduit of the second diameter on the second side of the inner arm.

17. A method of supporting cable or conduit relative to an electrical box, the method comprising:

aligning a bracket to a building structure, the bracket including an attachment portion, a support leg that extends from the attachment portion, and a support clip that extends from the support leg, the support clip integrally including:

an outer arm;

an inner arm that extends between the outer arm and the support leg; and a reduction finger;

the outer and inner arms collectively defining a first entrance to a support passage to resiliently support cable or conduit of a first diameter on a first side of the inner arm;

the inner arm and the support leg collectively defining a second entrance to the support passage to resiliently support cable or conduit of a second diameter, smaller than the first diameter, on a second side of the inner arm; and the reduction finger extending into the support passage to selectively support the cable or conduit of the first diameter or a cable or conduit of a third diameter, larger than the first diameter;

attaching the attachment portion of the bracket to the building structure, with the support clip of the bracket supported at an offset from the building structure by the support leg; and selectively inserting cable or conduit into the support passage defined between the support leg and the outer arm of the support clip, to one or more of:

support the cable or conduit of the first diameter in the support passage, between reduction finger, the outer arm, and the inner arm;

support the cable or conduit of the second diameter in the support passage, between the inner arm and the support leg; or support the cable or conduit of the third diameter in the support passage, between the reduction finger, the outer arm, and the inner arm.

18. The method of claim 17, wherein selectively inserting the cable or conduit into the support passage includes:

inserting the cable or conduit of the second diameter into the support passage through the second entrance, to support the cable or conduit of the second diameter between the inner arm and the support leg; and inserting a second cable or conduit of the second diameter into the support passage through the second entrance, to support the second cable or conduit between the inner arm and the support leg.

19. The method of claim 17, wherein supporting the cable or conduit of the first diameter in the support passage between the outer arm and the inner arm urges the inner arm against the support leg.

* * * * *